(12) United States Patent
Bedard et al.

(10) Patent No.: US 11,829,385 B2
(45) Date of Patent: *Nov. 28, 2023

(54) SYSTEMS, METHODS, AND DEVICES FOR GENERATION OF ANALYTICAL DATA REPORTS USING DYNAMICALLY GENERATED QUERIES OF A STRUCTURED TABULAR CUBE

(71) Applicant: deFacto Global, Inc., Troy, NY (US)

(72) Inventors: Robert Bedard, Troy, NY (US); Anthony Henry D'Anna, Gillette, NJ (US); Mike Galante, Montreal (CA)

(73) Assignee: deFacto, Troy, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,014

(22) Filed: May 19, 2022

(65) Prior Publication Data
US 2023/0112761 A1 Apr. 13, 2023

Related U.S. Application Data

(63) Continuation of application No. 16/665,722, filed on Oct. 28, 2019, now Pat. No. 11,366,831, which is a
(Continued)

(51) Int. Cl.
*G06F 7/00* (2006.01)
*G06F 16/28* (2019.01)
(Continued)

(52) U.S. Cl.
CPC .......... *G06F 16/283* (2019.01); *G06F 16/242* (2019.01); *G06F 16/245* (2019.01); *G06F 16/248* (2019.01)

(58) Field of Classification Search
CPC .... G06F 16/283; G06F 16/245; G06F 16/242; G06F 16/248
See application file for complete search history.

(56) References Cited

U.S. PATENT DOCUMENTS 5,604,854 A * 2/1997 Glassey ................. G06F 40/18
715/788
5,701,400 A * 12/1997 Amado .................... G06N 5/02
706/45

(Continued)

*Primary Examiner* — Mohammed R Uddin
(74) *Attorney, Agent, or Firm* — Knobbe Martens Olson & Bear LLP

(57) ABSTRACT

Certain embodiments described herein relate to data analysis systems, methods, and devices that comprise one or more processes and/or methodologies to add structure around a tabular database. By doing so, certain data analysis systems, methods, and devices can provide similar analytical functionalities as structured databases on one hand, as well as similar scalability and/or performance capabilities as tabular databases. In some embodiments, an add-in to a tabular data engine, such as Microsoft Excel, can be provided, through which a user can be allowed to input one or more dimensions and/or variables as desired for generating an analytical report. Based on such input, in certain embodiments, the system can be configured to build one or more data analysis expression (DAX) queries to dynamically generate a report, which can subsequently be displayed in the tabular data engine.

20 Claims, 14 Drawing Sheets

Related U.S. Application Data continuation of application No. 16/352,143, filed on Mar. 13, 2019, now Pat. No. 10,509,805.

(60) Provisional application No. 62/642,344, filed on Mar. 13, 2018.

(51) Int. Cl.
*G06F 16/242* (2019.01)
*G06F 16/248* (2019.01)
*G06F 16/245* (2019.01)

(56) References Cited

U.S. PATENT DOCUMENTS

| | | | | |
|---|---|---|---|---|
| 6,356,901 | B1* | 3/2002 | MacLeod | G06F 16/254 |
| 6,424,967 | B1* | 7/2002 | Johnson | G06F 16/2264 |
| | | | | 707/999.102 |
| 6,832,263 | B2* | 12/2004 | Polizzi | G06F 16/954 |
| | | | | 707/999.101 |
| 7,800,613 | B2* | 9/2010 | Hanrahan | G06T 11/206 |
| | | | | 345/440 |
| 8,260,764 | B1* | 9/2012 | Gruber | G06F 16/2428 |
| | | | | 707/708 |
| 9,189,515 | B1* | 11/2015 | Tamilmani | G06F 16/245 |
| 9,619,581 | B2* | 4/2017 | Hughes | G06F 16/283 |
| 9,760,571 | B1* | 9/2017 | Ben-Natan | G06F 16/93 |
| 10,169,446 | B1* | 1/2019 | Garlapati | G06F 16/284 |
| 2003/0229652 | A1* | 12/2003 | Bakalash | G06F 16/24556 |
| 2004/0167870 | A1* | 8/2004 | Wakefield | G06F 16/313 |
| 2005/0010550 | A1* | 1/2005 | Potter | G06F 16/283 |
| 2005/0010565 | A1* | 1/2005 | Cushing | G06F 16/902 |
| 2006/0080277 | A1* | 4/2006 | Nador | G06F 16/283 |
| 2006/0161544 | A1* | 7/2006 | Lee | G06F 16/2471 |
| 2007/0022093 | A1* | 1/2007 | Wyatt | G06F 16/283 |
| 2007/0027904 | A1* | 2/2007 | Chow | G06F 16/283 |
| | | | | 707/999.102 |
| 2007/0219893 | A1* | 9/2007 | Xu | G06Q 40/00 |
| | | | | 705/36 R |
| 2008/0270363 | A1* | 10/2008 | Hunt | G06F 16/2462 |
| 2008/0288524 | A1* | 11/2008 | Dumitru | G06F 16/2272 |
| | | | | 707/999.005 |
| 2008/0294596 | A1* | 11/2008 | Xiong | G06F 16/2452 |
| 2009/0172006 | A1* | 7/2009 | Ducaule | G06Q 10/10 |
| | | | | 707/999.102 |
| 2010/0076977 | A1* | 3/2010 | Wyatt | G06F 16/283 |
| | | | | 711/E12.017 |
| 2010/0211564 | A1* | 8/2010 | Cohen | G06F 16/951 |
| | | | | 707/769 |
| 2011/0153643 | A1* | 6/2011 | Haggie | G06Q 10/06 |
| | | | | 715/810 |
| 2011/0191361 | A1* | 8/2011 | Gupta | G06F 16/245 |
| | | | | 707/769 |
| 2012/0144284 | A1* | 6/2012 | Le Brazidec | G06F 16/283 |
| | | | | 715/219 |
| 2012/0239612 | A1* | 9/2012 | George | G06F 16/254 |
| | | | | 707/602 |
| 2012/0323885 | A1* | 12/2012 | Wang | G06F 16/2456 |
| | | | | 707/E17.054 |
| 2012/0323956 | A1* | 12/2012 | Dumitru | G06F 16/2471 |
| | | | | 707/769 |
| 2013/0054642 | A1* | 2/2013 | Morin | G06F 16/258 |
| | | | | 707/E17.014 |
| 2013/0339291 | A1* | 12/2013 | Hasner | G06F 16/283 |
| | | | | 707/601 |
| 2014/0032588 | A1* | 1/2014 | Getmanets | G06F 16/2452 |
| | | | | 707/760 |
| 2014/0074771 | A1* | 3/2014 | He | G06F 16/283 |
| | | | | 707/E17.014 |
| 2015/0019537 | A1* | 1/2015 | Neels | G06F 16/334 |
| | | | | 707/722 |
| 2015/0019559 | A1* | 1/2015 | Maquaire | G06F 16/907 |
| | | | | 707/740 |
| 2017/0116227 | A1* | 4/2017 | Shaked | G06F 16/211 |
| 2017/0116228 | A1* | 4/2017 | Alberg | G06F 16/258 |
| 2017/0199862 | A1* | 7/2017 | Litt | G06F 40/18 |
| 2018/0081921 | A1* | 3/2018 | Willcock | G06F 16/2264 |
| 2018/0121521 | A1* | 5/2018 | Bivol | G06F 16/284 |
| 2018/0349463 | A1* | 12/2018 | Bernhardy | G06F 16/213 |

* cited by examiner

SYSTEMS, METHODS, AND DEVICES FOR GENERATION OF ANALYTICAL DATA REPORTS USING DYNAMICALLY GENERATED QUERIES OF A STRUCTURED TABULAR CUBE

CROSS-REFERENCE TO RELATED APPLICATION(S)

The present application is a continuation of U.S. patent application Ser. No. 16/665,722, filed Oct. 28, 2019, which is a continuation of U.S. Pat. No. 10,509,805, filed Mar. 13, 2019, which claims the benefit under 35 U.S.C. § 119(c) of U.S. Provisional Patent Application No. 62/642,344, filed Mar. 13, 2018. Each of the foregoing applications is incorporated herein by reference in its entirety under 37 C.F.R. § 1.57. Also, any and all applications for which a foreign or domestic priority claim is identified in the Application Data Sheet as filed with the present application are hereby incorporated by reference under 37 C.F.R. § 1.57.

BACKGROUND

Field

The present application relates generally to the field of data structures and electronic databases, and more specifically to systems, methods, and devices for data analysis.

Description

Generally, levels of data "structure" can exist, ranging from unstructured raw data logs to analysis-specific data tables, which may be highly structured and designed to inform specific and currently relevant information needs. With the advance of unstructured database technologies, unstructured data has become easier to store and process. Some applications may not require data modelling, and data can be collected and stored from various sources and at large scale without knowledge of its significance or value. However, many applications can benefit from some form of structured data, as completely unstructured data analysis may require a potentially complex data preparation process requiring advanced skill sets and relatively large amount of time.

Many businesses collect and handle a vast amount of data and require structure in order to achieve an acceptable efficiency in analyzing the data and structuring operational responses to the information assembled within the data. For example, structure such as key performance indicators, standardized user/business/product metrics and even generic consumer behavior data stores may be essential to aiding a business to internally and externally communicate and attain business targets. Similarly, structured data facilitates the establishment of common operational characterizations of data, which may be essential for organizations.

More generally, adding structure to data may provide a systematic method of collecting information about a specific business phenomena or areas. As data is structured, the volume and variety of the data may decrease, along with the time needed to prepare, analyze, and report the data. As such, structured data may have certain advantages over raw, unstructured data, including its ability to provide meaningful insight to users who wish to draw inferences and conclusions from the data. Thus, there are benefits of both unstructured and structured data and some embodiments described herein may be designed to procure the efficiency and data analysis benefits of structured data while maintaining the speed and flexibility of unstructured data.

SUMMARY

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

Some embodiments herein relate to a computer-implemented method for dynamically generating an analytical report using one or more databases with applied structural characteristics and relational functionality, the computer-implemented method comprising: receiving, via a report designer of a dynamic user interface of a client service application on a user access point, one or more analytical report parameters, wherein the one or more analytical report parameters define a configuration of a requested analytical report; receiving, via the dynamic user interface of the client service application, one or more structural component inputs of the requested analytical report; transmitting the one or more analytical report parameters and the one or more structural component inputs to a reporting service, wherein the reporting service acts as a link between the client service application and a report generator; constructing, by the report generator in conjunction with a Data Analysis Expression (DAX) query builder, one or more DAX queries based on the received one or more analytical report parameters and/or the one or more structural component inputs of the requested analytical report; querying one or more tabular databases and/or one or more relational star schemas using the constructed DAX queries, wherein the one or more tabular databases and/or one or more relational star schemas comprise a tabular cube, wherein the tabular cube comprises an organizational data structure comprising one or more data dimensions and/or hierarchies within the one or more data dimensions; generating, by the report generator, the requested analytical report based on one or more query results, wherein the query results are returned by the one or more tabular databases and/or relational star schemas in response to the querying; transmitting, from the reporting service to the client service application, the requested analytical report; and rendering the requested analytical report within the client service application, wherein the user access point comprises a computer processor and an electronic storage medium.

Some embodiments herein are related to a computer-implemented method for dynamically generating an analytical report using one or more tabular databases with applied structural characteristics and relational functionality, the computer-implemented method comprising: receiving, via a report designer of a dynamic user interface of a client service application on a user access point, one or more analytical report parameters, wherein the one or more analytical report parameters define a configuration of a requested analytical report; receiving, via the dynamic user interface of the client service application, one or more structural component inputs of the requested analytical report; transmitting the one or more analytical report parameters and the one or more structural component inputs to a reporting service, wherein the reporting service acts as a link between the client service application and a report generator; constructing, by the report generator in conjunction with a Data Analysis Expression (DAX) query builder, one or more DAX queries based on the received one or more analytical report parameters and/or the one or more structural component inputs of the requested analytical report; querying the one or more tabular databases using the constructed DAX queries, wherein the one or more tabular databases comprise a tabular cube, wherein the tabular cube is constructed by retroactively transforming and separating a data set into fact data and metadata using one or more relational star schema, and wherein the tabular cube comprises an organizational data structure comprising one or more data dimensions and/or hierarchies within the one or more data dimensions; generating, by the report generator, the requested analytical report based on one or more query results, wherein the query results are returned by the one or more tabular databases and/or relational star schemas in response to the querying; transmitting, from the reporting service to the client service application, the requested analytical report; and rendering the requested analytical report within the client service application, wherein the user access point comprises a computer processor and an electronic storage medium.

Some embodiments herein relate to a computer-implemented method for dynamically generating an analytical report using one or more tabular databases with applied structural characteristics and relational functionality, the computer-implemented method comprising: receiving, via a report designer of a dynamic user interface of a client service application on a user access point, one or more analytical report parameters, wherein the one or more analytical report parameters define a configuration of a requested analytical report, wherein the client service application comprises an unstructured, two-dimensional tabular data engine; receiving, via the dynamic user interface of the client service application, one or more structural component inputs of the requested analytical report; transmitting the one or more analytical report parameters and the one or more structural component inputs to a reporting service, wherein the reporting service acts as a link between the client service application and a report generator; constructing, by the report generator in conjunction with a Data Analysis Expression (DAX) query builder, one or more DAX queries based on the received one or more analytical report parameters and the one or more structural component inputs of the requested analytical report; querying the one or more tabular databases using the constructed DAX queries, wherein the one or more tabular databases comprise a tabular cube, wherein the tabular cube is constructed by retroactively transforming and separating a data set accessible by the unstructured, two-dimensional tabular data engine into fact data and metadata using one or more relational star schemas, and wherein the tabular cube comprises an organizational data structure comprising one or more data dimensions and/or hierarchies within the one or more data dimensions; generating, by the report generator, the requested analytical report based on one or more query results, wherein the one or more query results are returned by the one or more tabular databases in response to the querying; transmitting, from the reporting service to the client service application, the requested analytical report; and rendering the requested analytical report within the client service application, wherein the user access point comprises a computer processor and an electronic storage medium.

Some embodiments herein relate to a system for dynamically generating an analytical report using one or more tabular databases with applied structural characteristics and relational functionality, the system comprising: a client service application comprising an unstructured, two-dimensional tabular data engine and a dynamic user interface, the dynamic user interface comprising a report designer configured to allow user input of one or more analytical report parameters and one or more structural component inputs of an analytical data report; a Data Analysis Expression (DAX) query builder; a report generator; a reporting service that acts as a link between the client service application and the report generator; one or more relational star schemas; one or more tabular databases, wherein the one or more tabular databases comprise a tabular cube, wherein the tabular cube is constructed by retroactively transforming and separating a data set accessible by the unstructured, two-dimensional tabular data engine into fact data and metadata using the one or more relational star schemas, and wherein the tabular cube comprises an organizational data structure comprising one or more data dimensions and/or hierarchies within the one or more data dimensions; one or more computer readable storage devices configured to store a plurality of computer executable instructions; and one or more hardware computer processors in communication with the one or more computer readable storage devices and configured to execute the plurality of computer executable instructions in order to cause the system to: receive, via the report designer, the one or more analytical report parameters, wherein the one or more analytical report parameters define a configuration of a requested analytical report; receive, via the report designer, the one or more structural component inputs of the requested analytical report; transmit the one or more analytical report parameters and the one or more structural component inputs to the reporting service; construct, by the report generator in conjunction with the DAX query builder, one or more DAX queries based on the received one or more analytical report parameters and the one or more structural component inputs of the requested analytical report; query the one or more tabular databases using the constructed DAX queries; generate, by the report generator, the requested analytical report based on one or more query results, wherein the one or more query results are returned by the one or more tabular databases in response to the querying; transmitting, from the reporting service to the client service application, the requested analytical report; and rendering the requested analytical report within the client service application.

Some embodiments herein are related to a computer-implemented method for dynamically generating an analytical report using one or more databases with applied structural characteristics and relational functionality, wherein the client service application comprises a tabular data engine.

Some embodiments herein are related to a computer-implemented method for dynamically generating an analytical report using one or more databases with applied structural characteristics and relational functionality, wherein the tabular data engine is Microsoft Excel and the dynamic user interface is launched via an Excel add-in.

Some embodiments herein are related to a computer-implemented method for dynamically generating an analytical report using one or more databases with applied structural characteristics and relational functionality, wherein the dynamic user interface is built into the tabular data engine.

Some embodiments herein are related to a computer-implemented method for dynamically generating an analytical report using one or more databases with applied structural characteristics and relational functionality, wherein the analytical report comprises a web-based, mobile-based, or Microsoft Excel-based report Some embodiments herein are related to a computer-implemented method for dynamically generating an analytical report using one or more databases with applied structural characteristics and relational functionality, wherein the analytical report comprises one or more visualization tools, charts, or dashboards.

Some embodiments herein are related to a computer-implemented method for dynamically generating an analytical report using one or more databases with applied structural characteristics and relational functionality, wherein the one or more structural component inputs comprise requested dimensions and/or hierarchies.

Some embodiments herein are related to a computer-implemented method for dynamically generating an analytical report using one or more databases with applied structural characteristics and relational functionality, wherein the analytical report parameters comprise row parameters, column parameters, slicers, filters, or report properties.

Some embodiments herein are related to a computer-implemented method for dynamically generating an analytical report using one or more databases with applied structural characteristics and relational functionality, wherein the one or more relational star schemas comprise a Structured Query Language (SQL) Server star schema.

Some embodiments herein are related to a computer-implemented method for dynamically generating an analytical report using one or more databases with applied structural characteristics and relational functionality, wherein the one or more relational star schemas comprise relational data associated with tabular data stored in the one or more tabular databases.

Some embodiments herein are related to a computer-implemented method for dynamically generating an analytical report using one or more databases with applied structural characteristics and relational functionality, wherein the relational data comprises metadata.

Some embodiments herein are related to a computer-implemented method for dynamically generating an analytical report using one or more databases with applied structural characteristics and relational functionality, wherein the relational data is generated through an administrator interface and/or an integrated data source.

Some embodiments herein are related to a computer-implemented method for dynamically generating an analytical report using one or more databases with applied structural characteristics and relational functionality, wherein the relational data is generated through an administrator interface and/or an integrated data source, wherein the integrated data source is integrated using Structured Query Language (SQL) Server Integration Services (SSIS)

Some embodiments herein are related to a computer-implemented method for dynamically generating an analytical report using one or more databases with applied structural characteristics and relational functionality, wherein the one or more relational star schemas comprise relational data associated with tabular data stored in the one or more tabular databases, wherein the DAX query builder is in communication with the one or more relational star schemas, and wherein the one or more star schemas provides the relational data to the DAX Query builder.

Some embodiments herein are related to a computer-implemented method for dynamically generating an analytical report using one or more databases with applied structural characteristics and relational functionality, wherein the one or more relational star schemas comprise relational data associated with tabular data stored in the one or more tabular databases, wherein the constructing the one or more DAX queries comprises utilizing the relational data.

Some embodiments herein are related to a computer-implemented method for dynamically generating an analytical report using one or more databases with applied structural characteristics and relational functionality, further comprising performing, by a business logic engine, one or more procedural calculations, wherein the one or more procedural calculations can be called on-demand via the dynamic user interface of a client service application.

Some embodiments herein are related to a computer-implemented method for dynamically generating an analytical report using one or more databases with applied structural characteristics and relational functionality, further comprising performing, by a business logic engine, one or more procedural calculations, wherein the one or more procedural calculations can be called on-demand via the dynamic user interface of a client service application, wherein the procedural calculations comprise at least one of: write-backs, foreign currency conversions, allocations, intercompany matchings and/or eliminations, binary tuple calculations, copying data from one tuple to another, MDX and/or DAX to fact data, or custom user-defined calculations.

Some embodiments herein are related to a computer-implemented method for dynamically generating an analytical report using one or more databases with applied structural characteristics and relational functionality, further comprising obtaining one approval, via the dynamic user interface, from one or more authorized users to generate the requested analytical report.

Some embodiments herein are related to a computer-implemented method for dynamically generating an analytical report using one or more databases with applied structural characteristics and relational functionality, wherein the tabular cube comprises fact data and relational data.

Some embodiments herein are related to a computer-implemented method for dynamically generating an analytical report using one or more databases with applied structural characteristics and relational functionality, wherein the one or more tabular databases comprise a Structured Query Language (SQL) Server Analysis Services (SSAS) tabular model.

The methods summarized above and set forth in further detail below may describe certain actions taken by a practitioner; however, it should be understood that these steps can also include the instruction of those actions by another party.

BRIEF DESCRIPTION OF THE DRAWINGS

A better understanding of the methods and systems described herein will be appreciated upon reference to the following description in conjunction with the accompanying drawings, wherein:

FIG. 6 illustrates an example report generated by a data analysis system for a tabular data engine;

FIG. 11 illustrates an embodiment of a user interface listing example SQL server application definition tables of a data analysis system;

DETAILED DESCRIPTION

Figure 1A:
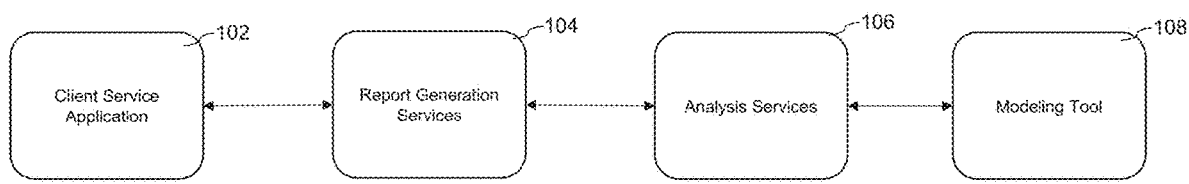
FIG. 1A is a block diagram illustrating features of one or more embodiments of a data analysis system.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Generally speaking, electronic databases and/or data structures can be tabular or relational by nature. In certain tabular databases, data may be organized by one or more rows and/or columns. Tabular data structures can provide certain advantages in terms of data extraction and/or management. For example, in some tabular data structures, extraction, management, and/or modification can be fast and/or efficient in terms of processing power. However, tabular databases may not provide sufficient information or data relating to relationships between certain data in the database. Certain relational databases include such relational data in their structure to provide additional insight regarding the relationships between data. However, purely relational databases can have certain disadvantages compared to tabular databases due to its complexity in design. For example, while analysis of data in a relational database may be more robust, its scalability, performance, and/or efficiency may be compromised as compared to tabular databases.

As such, it can be advantageous to provide a database or data structure that can provide the performance, scalability, and/or efficiency of a tabular data structure while, at the same time, provide search and/or query capabilities possible in a relational data structure. Accordingly, some embodiments of systems, devices, and methods described herein provide the foregoing by providing hierarchies to a tabular data structure. In particular, in some embodiments, the systems, devices, and methods described herein allow a tabular database to mimic databases, thereby maintaining the scalability and/or performance of tabular data structures while also providing the improved analytical capabilities of purely relational databases. Further, in some embodiments, the systems, devices, and methods described herein are configured to effectively dynamically transform a data in a tabular database into a relational database to allow analytical queries based on relationships of the data in the tabular database, thereby adding structure to otherwise unstructured data.

In some embodiments, the systems, methods, and devices disclosed herein are configured to utilize two-dimensional tabular data structures to effectively store three-dimensional data without the use of stacked tabular data structures. In some embodiments, secondary data related to certain primary data elements, such as relationships between or among data, are stored in the same two-dimensional tabular data structure that stores the primary data as opposed to creating a wholly three-dimensional data structure for storing the related secondary data that is associated with the primary data elements. One advantage of storing secondary data along side or within the same two-dimensional tabular data sheet as the primary data can be the simplicity of the data structure. In certain situations, the processing of secondary data stored in a three-dimensional data structure can be process intensive and cumbersome. Additionally, three-dimensional data structures can require special processing systems and/or software that may not be widely available to various users. However, two-dimensional tabular data processing systems are widely available to users. Accordingly, some systems, methods, and devices disclosed herein for enabling widely available two-dimensional tabular data processing systems to store secondary data within the same two dimensional tabular data structure as primary data or along side primary data in the same two-dimensional tabular data structure can allow more users to be able to process secondary data that is related to primary data without the need for a three-dimensional data processing system. By utilizing a two-dimension tabular data structure, users can save time and money by avoiding the complexities and costs associated with operating relational database or other three-dimensional data structures. In some embodiments, the systems disclosed herein allow for the same or substantially similar ability to query the specialized two-dimensional tabular data structures configured to store data as if stored in a three-dimensional database by utilizing one or more data analysis expression (DAX) queries to dynamically generate one or more reports, which can subsequently be displayed in a tabular data engine system. As such, in some embodiments, some or all analytical functions and queries that are generally available in online analytical processing (OLAP) and/or other relational database systems can be provided in a tabular environment, for example, through dynamically generating and/or combining DAX queries to mimic such functionalities.

As such, some embodiments described herein relate to data warehouses (DW or DWH), data stores, data sets, and enterprise data warehouses (EDW), tabular model databases, and/or other forms of data systems (collectively "data storage and reporting systems"). As used herein, data storage and reporting systems may comprise a system used for reporting, data analysis, and providing business intelligence services. In some embodiments, data storage and reporting systems may serve as central repositories of integrated data from one or more disparate sources. In some embodiments, data storage and reporting systems store current and historical data within a single database or multiple databases that may be used for creating analytical reports for users.

In some embodiments, the systems, devices, and methods herein are related to generating a report based on fact data and relational information from a two-dimensional (2D) tabular database. In some embodiments, the systems, devices, and methods herein are configured to analyze and transform a 2D tabular data structure for creating additional 2D tabular data structures that identify the relational information extracted from the original 2D tabular data structure. In some embodiments, the systems, devices, and methods are configured to utilize DAX queries to analyze the plurality of dynamically or otherwise generated outputted 2D tabular data structures extracted from the original inputted 2D data structure to create reports. In some embodiments, the system is configured to respond to new user input into the original 2D tabular data structure (e.g. provide updated data) by analyzing and transforming the 2D tabular data structure in order to generate one or more updated output 2D tabular database structures. In some embodiments, an inputted data structure refers to raw data or other data inputted into the system (e.g. via data stores, manual input, APIs, etc.), while an outputted data structure refers to a transformed, generated and/or extracted data structure that has been altered by the systems, methods, and devices herein. In some embodiments, the system is configured to apply DAX queries to query a plurality of tabular data structures, wherein the plurality of tabular data structures comprise relational information generated by analyzing, transforming, and/or extracting relational information from an original inputted 2D tabular data set. In some embodiments, the systems, devices, and methods herein may mimic the functionality of Multidimensional Expressions (MDX) without utilization of MDX. In some embodiments, the systems, devices, and methods herein may mimic the functionality of MDX using Data Analysis Expressions (DAX). For example, because of the unique transformation and structure of 2D tabular data described herein, the systems, devices, and methods described herein may allow for multi-dimensional analysis including, e.g., named sets, calculated members, Parent-Child relationships, Many to Many, attribute relationships, and key vs. Name, among others using DAX queries.

In some embodiments, the data stored in data storage and reporting systems may manually and/or automatically uploaded from operational systems, employees, administrators, or other users. In some embodiments, the data may pass through an operational data store and may require data cleansing, pre-processing, processing and/or normalization for additional operations to ensure data quality before it is used in the data storage and reporting systems. Additionally, some embodiments herein relate to enhancing, augmenting, and/or improving the usability and effectiveness of data analysis and reporting by adding structure to data within data storage and reporting systems.

Generally, levels of "structure" can exist within data, ranging from unstructured raw data logs to analysis-specific data tables, which may be highly structured and designed to inform specific and currently relevant information needs. With the advance of unstructured database technologies, unstructured data has become easier to store and process. Some applications may not require data modelling, and data can be collected and stored from various sources and at large scale without knowledge of its significance or value. However, many applications can benefit from some form of structured data, as completely unstructured data analysis may require a potentially complex data preparation process requiring advanced skill sets and relatively large amount of time.

As a non-limiting example, many businesses collect and handle a vast amount of data and require structure in order to achieve an acceptable efficiency in analyzing the data and structuring operational responses to the information assembled within the data. For example, structure such as key performance indicators, standardized user/business/product metrics and even generic consumer behavior data stores may be essential to aiding a business to internally and externally communicate and attain business targets. Similarly, structured data facilities the establishment of common operational characterizations of data, which may be essential for organizations.

More generally, adding structure to data may provide a systematic method of collecting information about a specific business phenomena or areas. As data is structured, the volume and variety of the data may decrease, along with the time needed to prepare, analyze, and report the data. As such, structured data may have certain advantages over raw, unstructured data, including its ability to provide meaningful insight to users who wish to draw inferences and conclusions from the data. Thus, there are benefits of both unstructured and structured data and some embodiments described herein may be designed to procure the efficiency and data analysis benefits of structured data while maintaining the speed, low processing power, and/or flexibility of unstructured data.

As used herein, a data dimension may comprise a structure for categorizing facts and measures in a data set. In some embodiments, a dimension may provide a lens or category for focusing on specific data of a data store or warehouse. In some embodiments, adding dimensions to a data store may enable users to answer questions (e.g. business questions) about the data set. In some embodiments, example dimensions may comprise, e.g., people, products, services, places and times. In some embodiments, multiple dimensions can be utilized to further concentrate on specific desired data. For example, the systems, methods, and devices described herein may facilitate the addition of multiple dimensions to a tabular data set. For example, a user may able to create a report displaying sales of a specific product for a specific employee for a specific month of the year. In the above example, the specific product, employee, and month would each be a dimension. In some embodiments, the systems, methods, and devices herein can be configured to examine data with multiple dimensions. In some embodiments, there are no limits on the number of dimensions through which a data set can be examined. In some embodiments, the systems, methods, and devices described herein may be configured to enable the addition of any type of dimensions, including, e.g., conformed dimensions, junk dimension, degenerate dimensions, and role-playing dimensions, among others.

In some embodiments, dimensions may provide structured labeling information to otherwise unordered numeric measures in a data store. In some embodiments, a dimension is a data set composed of individual, non-overlapping data elements. In some embodiments, the primary functions of dimensions may be to provide filtering, grouping and labelling of data.

In some embodiments, dimensions in a data warehouse may organized into one or more hierarchies. Hierarchical data may be defined as a set of data items that are related to each other by hierarchical relationships. Examples of the hierarchical data that is commonly stored in databases include, e.g., organizational structures, file systems, a set of tasks in a project, taxonomies, and/or links between web pages, among others.

Hierarchical relationships may exist where one item of data is the parent of another item. For example, the data of a sale may be used as a dimension for a data store, wherein the sale date can be grouped or organized into multiple hierarchies, such as the week, month, year, decade, etc. into which the sale date falls. Another example of a data hierarchy that may be utilized by the systems, methods, and devices described herein could be a personnel hierarchy comprising employee names, departments, companies, etc. In some embodiments, a data hierarchy comprises another form of structure that may, for example, provide a methodical organization of data into incremental components Certain embodiments described herein relate to data analysis systems, methods, and devices that comprise one or more processes and/or methodologies to add structure around a tabular database. By doing so, certain data analysis systems, methods, and devices can provide similar analytical functionalities as structured databases on one hand, as well as similar scalability and/or performance capabilities as tabular databases. As a non-limiting example, in some embodiments, an add-in to a tabular data engine, such as Microsoft Excel, Google sheets, OpenOffice Calc, LibreOffice Calc, LibreOffice, Numbers, Visicalc, or the like can be provided, through which a user can be allowed to input one or more dimensions and/or variables as desired for generating an analytical report. Based on such input, in certain embodiments, the system can be configured to build one or more data analysis expression (DAX) queries to dynamically generate a report, which can subsequently be displayed in the tabular data engine. Certain embodiments herein relate to systems, methods, and devices for enhancing financial intelligence of enterprises and business by providing data analysis and reporting functionality including, e.g. financial reporting, budgeting, consolidation, and income statement/balance sheet/cash flow statement, among others. In some embodiments, the systems, devices, and methods described herein comprise a highly configurable, user-friendly solution; enabling more efficient data analysis and reporting, improved responsiveness and control of cash flow, management reporting and regulatory compliance. Some embodiments are configured to function with multi-company, multi-currency and multi-period data sets. Some embodiments provide accurate information with consistent availability in real-time, enabling smarter, better informed business decisions.

Generally, tabular data may be considered a fundamental unit of data organization. Within a tabular database, data may be organized by row, such that each row corresponds to a unique identifier such as, e.g., the time, place, or the user for which the data was collected. As described herein, storing data in a tabular format may provide many benefits including ease of data extraction based on the specific row organization. However, a tabular data set may be severely limited in its capability to efficiently relay information about relationships between measures in the data set. In particular, for example, answering relational questions about the data in a tabular data set may require that the entire data set be available (e.g. read into a computer memory) before a responsive subset of the data can be obtained.

A relational model of data may be superior in some aspects to a purely tabular model. In some embodiments, relational models provide a basis for high level data languages which may yield maximal independence between programs on the one hand and machine representation and organization of data on the other. Thus, one of the advantages of a relational data model is replace a traditional data table with a query language that allows one to pose questions and receive answers about a data store and the relationships between data.

However, there may also be drawbacks to a purely relational database. Relational databases may be expensive and require sophisticated software and/or database administrators to set up and maintain. Furthermore, advances in the size and complexity of storable information may cause additional drawbacks, such as requiring more processing power and/or time. As described above, relational databases may be designed to organize data by common characteristics in order to easily extract related information. However, complex data such as, for example, images, videos, designs, and other multimedia formats are not easily categorized or grouped relationally.

Generally speaking, certain data analysis services can use cube technology and/or other relational data structures to provide structured data analyses and results. However, one downside to such data analysis services can arise from limitations as to performance and/or scalability. For example, for big data, performance and/or scalability of data analysis services based solely on relational data structures may be limiting and/or render the services inoperable. In contrast, tabular data engines and/or structures can be an advantageous alternative by providing enhanced scalability and performance, for example for big data analyses. At the same time, however, one shortcoming of tabular data engines and/or structures can arise from the lack of structural aspect that can be necessary and/or useful for structure data analyses, for example in financial applications.

Thus, both purely tabular and purely relational databases have significant drawbacks as well as distinct advantages. In order to address such concerns, certain embodiments described herein relating to data analysis systems, methods, and devices can comprise one or more processes and/or methodologies to add structure around a tabular database. By doing so, certain data analysis systems, methods, and devices can provide similar, substantially similar, or at least some analytical functionalities as structured databases on one hand, as well as similar, substantially similar, or at least some scalability and/or performance capabilities arising from tabular databases. As a non-limiting example, in some embodiments, an add-in to a tabular data engine, such as Microsoft Excel or other tabular data engines mentioned herein, can be provided as part of the system, through which a user can be allowed to input one or more dimensions and/or variables as desired for generating an analytical report. Based on such input, the system can be caused to build one or more data analysis expression (DAX) queries to dynamically generate a report, which can subsequently be displayed in the tabular data engine. As such, in certain embodiments, some or all analytical functions and queries that are generally available in online analytical processing (OLAP) and/or other relational databases can be provided in a tabular environment, for example through dynamically generating and/or combining DAX queries to mimic such functionalities.

Generally speaking, DAX can be the native formula and query language for various data analytics programs, including, e.g., Microsoft PowerPivot, Power BI Desktop and SQL Server Analysis Services (SSAS). DAX includes functions designed to work with relational data and perform dynamic data aggregation for the purpose of performing data processing. Furthermore, DAX provides a specialized syntax for querying tabular models and allows users to define custom calculations in calculated columns and measures. In some embodiments, DAX provides a variety of data analysis functions that can be utilized to, e.g. perform calculations using dates and times, or create conditional values, filter data, return a table as a result of a query, rather than a single value, and/or provide time intelligence, which allows creation of calculations using meaningful ranges of dates.

By providing multi-dimensional query functionality to a tabular data structure, some embodiments can comprise substantially improved scalability and/or performance over OLAP or other analytical processes and/or services performed on a purely relational database. In other words, certain embodiments can be able to produce larger reports faster compared to analytical systems that operate on a purely relational database. For example, for certain analytical processes, some embodiments described herein can outperform systems running on a purely relational database, in terms of processing time and/or power, by about 10%, about 20%, about 30%, about 40%, about 50%, about 60%, about 70%, about 80%, about 90%, about 100%, about 200%, about 300%, about 400%, about 500%, about 600%, about 700%, about 800%, about 900%, about 1000%, about 1500%, about 2000%, and/or within a range defined by two of the aforementioned values.

Further, some embodiments can allow processing of certain analytical processes that could not have been processed by a data analysis system operating in a purely relational database framework. For example, a data analysis system operating on a purely relational database may not be able to perform a particular analytical process due to the size and/or complexity of the analysis, for example such as the size of the data returned arising from expansion capabilities and/or multi-dimensionality. In contrast, certain embodiments described herein that comprise tabular capability are able to handle the increased size of data, for example arising from expansion capabilities, thereby allowing for substantially faster processing time and power. As such, certain embodiments can comprise substantially improved reporting results and speed compared to data analysis services operating in a purely relational data framework.

One technical difficulty in providing such structural aspects to tabular data can result from the fact that tabular databases are generally known not to be compatible with applications that have structured data. As such, certain embodiments described herein can require structure and/or modifications that allow delivery of certain types of features typically built into applications for structured data. For example, in some embodiments, the system can comprise a structure that allows certain features built into multidimensional expressions (MDX) to be modified for tabular applications, such as Microsoft Excel, by utilizing data analysis expression (DAX) queries. In addition, the same or similar expansion capability that can be easily provided in MDX, which is generally not available in DAX, can be created or mimicked in some embodiments to deliver similar or analytical features in tabular format and gain performance automatically through the tabular nature. More specifically, MDX can include hierarchies in the language, which can make generating reports that do expansions simpler. DAX, in contrast, generally does not have the ability to use hierarchies in the language. Thus, in some embodiments, a system can be configured to build DAX queries behind the scenes to deliver similar expansion capabilities but without using language that comprises the ability to use data hierarchies. As such, in some embodiments, the system can provide additional capability to handle structured reporting needs and/or features that users would be able to see in OLAP, which are not automatically built into DAX, as well as increased performance arising from the tabular aspect. Some embodiments herein comprise a multi-dimensional tabular database, with the ability to handle a plurality of data dimensions. In some embodiments, the tabular database comprises 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 200, 300, 400, 500, 600, 700, 800, 900, 1000, 2000, 3000, 4000, 5000, or 10,000 dimensions, or any value between the aforementioned values.

In certain embodiments, a user can be allowed to generate structured reports by utilizing an add-in to Microsoft Excel that can build DAX queries behind the scenes to generate reports and provide similar features as those previously existing in MDX. In some embodiments, instead of being an add-in to Microsoft Excel, the system can comprise a user interface in the form of an add-in for any other tabular database engine, such as those described herein. In other embodiments, instead of being an add-in, the system itself can comprise a tabular database. Further, in some embodiments, the system can be used to provide web-based reporting, mobile-based reporting, Excel-based reporting, and/or any other interface or environment. In certain embodiments, the results of a report generated can be provided to a machine, such as a machine-learning model, and/or a user computing system. In some embodiments, the system can be configured to dynamically generate report(s) for and/or be configured to perform analyses for one or more visualization tools, charts, and/or dashboards, such as Microsoft BI, Tableau, or the like. In certain embodiments, the system can be configured to dynamically generate report(s) for and/or be configured to perform analyses for one or more components of Microsoft Office, Office 365, and/or the like.

In some embodiments, the systems, devices, and methods described herein may comprise one or more independent service portals for dynamically generating a data analysis report based on a modified tabular database comprising structural features. For example, the systems, devices, and methods described herein may comprise a client service portal/platform (e.g. Excel add-in, dynamic application user interface) for requesting and authoring reports, inputting requested analysis, and structuring the request output. The systems, devices, and methods described herein may also comprise an administrative service interface for administering a reporting application of the system.

In some embodiments, the one or more service portals/interfaces may function independently. For example, the system may comprise an end-user request interface for requesting and structuring a report and a separate administrator interface for interfacing with, e.g., an S SAS tabular database and/or a Structured Query Language (SQL) Server Star Schema.

In some embodiments, an SQL Server comprises a database management system server for storing and retrieving data requested by various modules and/or applications of the systems, methods, and devices described herein.

In some embodiments, the systems, methods, and devices described herein comprise an administrative flow and a reporting flow. In some embodiments, the reporting flow comprises a client service application comprising a dynamic user interface for requesting an analytical data report. In some embodiments, the client service application comprises a tabular data engine, such as, for example, Microsoft Excel. In some embodiments, the client service application comprises an Excel add-in configured to provide a user interface for designing and requesting an analytical data report. In some embodiments, the client service application comprises a report designer for designing and storing analytical data report requests. In some embodiments, the report designer may allow a user to dynamically set up the structure of a report/template, such as rows, columns, slicers, filters, properties, or the like. In some embodiments, the report designer may also allow input of one or more dimensions and/or hierarchies to be included in the analytical data report. In some embodiments, the client service application can be configured to launch the report designer. In some embodiments, the report designer comprises a web service that is connected to the client service application.

In some embodiments, the client service application comprises a report designer, wherein the client service application and report designer are configured to access one or more data applications for which a report can be generated. In some embodiments, a user may select one or more applications for which a report request can be generated. In some embodiments, the user may define various report properties and/or parameters that can be saved within the system. In some embodiments, the user may request a report using a new and/or saved report request. In some embodiments, the report request is transmitted to a reporting service, as described herein, which collaborates with a report generator to generate the requested report. The reporting generator functions by dynamically constructing DAX queries to query a SSAS Tabular database and/or star schema comprising tabular data that has been transformed, as described herein, to comprise structure (e.g. dimensions, hierarchies, etc.). In some embodiments, the reporting service transmits the completed report to the client service application, which can render and display the report via, e.g. Microsoft Excel.

In some embodiments, a designed report can be saved by a user and/or automatically stored in a server and/or user access point. In some embodiments, an analytical report and/or report template can be stored and refreshed via the client service application and/or report designer. Refreshing the analytical report may update the elements therein if, for example, the underlying data for which the report is being generated has been altered.

In some embodiments, a designed report is sent to a reporting service. In some embodiments, the reporting service enables communication between the client service application/report designer and the other systems described herein (e.g. report generator, administrative service, DAX query builder, etc.). In some embodiments, the reporting service communicates the elements of a report request (including, e.g. report parameters, format, data structure, etc.) to the report generator and/or a DAX query builder, which may construct one or more DAX queries for querying the underlying databases to generate the requested report.

In some embodiments, the client service application (e.g. tabular data engine, Excel add-in, report designer, etc.) may comprise one or more of at least the following functions.

AddUserToSharedFile

In some embodiments, the client service application comprises a report library comprising stored report templates and/or completed reports. In some embodiments, the client service application may comprise a report library service call operation that may be used by the client service application (e.g. Excel add-in) that allows a user to share a personal Excel report/template with other users in the application. In some embodiments, the client service application may also comprise functionality to set permissions for viewing, refreshing, and/or editing a report, such that only certain users can access these functionalities. In some embodiments, the client service application may be configured to allow synchronous, real time viewing, editing, and/or refreshing of analytical reports and/or report templates. In some embodiments, the client service application may also be configured to provide asynchronous viewing, editing, and/or refreshing of analytical reports and/or report templates.

CheckJobActivity

In some embodiments, the client service application may comprise a job monitoring service call operation used by the client service application (e.g. Excel add-in) to report on the status of a specific job submitted to a Business Logic/Calculation engine for example. In some embodiments, the Business Logic/Calculation engine can be used by the system for procedural calculations in a library. For example, such procedural calculations can include, but not limited to, write-back(s) to the system (such as for budgeting and/or forecasting), foreign currency conversion, allocations, inter-company matching and/or eliminations, binary tuple calculations (such as addition, subtraction, multiplication, division), copying data from one tuple to another, MDX and/or DAX to fact data, and/or other custom calculations (for example per customer requirements).

DeleteFileFromLibrary

In some embodiments, the client service application may comprise a report library service call operation used by the client service application (e.g. Excel add-in) that allows a user to remove an Excel report/template from a list of public or personal reports for example. This function may enable reports to be deleted for privacy/security purposes. In some embodiments, this function may protect personal/business data, maintain secrecy of sensitive data/information, and/or prevent authorized recipients from forwarding confidential information to unauthorized third parties.

ExecuteQuery

In some embodiments, the client service application may comprise a DAX/SQL service call operation that runs from a Visual Basic for applications (VBA) macro in Excel for example to invoke custom queries defined in the client service application and return the results to the macro operation for rendering to the end user in Excel or other tabular data engine.

ExtractData

In some embodiments, the client service application comprises a data manager service call operation that can be used by the client service application (e.g. Excel add-in) to dynamically generate a DAX query based on a user's input in the data manager and render the results of the Extract Query in Excel or other tabular data engine.

GetAllDimensionHierarchyColumns

In some embodiments, the client service application comprises various metadata service calls operations for retrieving and displaying information regarding metadata for a specific one or more data stores (i.e. Application).

In some embodiments, the client service application comprises a metadata service call operation that may be used by the client service application (e.g. Excel add-in) to retrieve and display a complete list of attribute hierarchy columns for each hierarchy defined for each dimension in one or more specified data stores (i.e. Applications).

GetApplicationList

In some embodiments, the client service application comprises a metadata service call operation that may be used by the client service application (e.g. Excel add-in) to retrieve a complete list of data stores (i.e. Applications) that the current logged in user has access to based on the user's security settings.

GetBusinessRuleDimFilters

In some embodiments, the client service application comprises a metadata service call operation call that can be used by the client service application (for example, Excel add-in) when running a calculation in the Business Logic/Calculation engine or Business Rule of a data manager for example. In some embodiments, this service call returns a list of dimension filters that a user may be required to select to run the selected calculation or Business Rule.

GetBusinessRuleList

In some embodiments, the client service application comprises a metadata service call operation call that can be used by the client service application (for example, Excel add-in) to retrieve a complete list of calculations or Business Rules that the current logged in user has access to based on the user's security settings.

GetBusinessRuleStepParameters

In some embodiments, the client service application comprises a metadata service call operation call that can be used by the client service application (e.g. Excel add-in) to retrieve the parameters defined for a specific calculation and/or Business Rule step when running a rule from a data manager for example.

GetBusinessRuleSteps

In some embodiments, the client service application comprises a metadata service call operation call that can be used by the client service application (e.g. Excel add-in) to retrieve the steps defined for a specific calculation and/or Business Rule when running a rule from the Data Manager.

GetDimensionHierarchyList

In some embodiments, the client service application comprises a metadata service call operation call that can be used by the client service application (e.g. Excel add-in) to retrieve the hierarchies defined for a specific defined dimension in one or more data stores.

GetDimensionHierarchyMembers

In some embodiments, the client service application comprises a metadata service call operation call that can be used by the client service application (e.g. Excel add-in) to retrieve the members that are defined for a specific hierarchy in a specific defined dimension in one or more data stores.

GetDimensionList

In some embodiments, the client service application comprises a metadata service call operation call that can be used by the client service application (e.g. Excel add-in) to retrieve a list of dimensions defined for a specific one or more data stores (i.e. Applications).

GetDimensionMembers

In some embodiments, the client service application comprises a metadata service call operation call that can be used by the client service application (e.g. Excel add-in) to retrieve a complete list of members defined for a specific dimension in one or more data stores (i.e. Applications) regardless of the hierarchy of each member.

GetDimensionProperties

In some embodiments, the client service application comprises a metadata service call operation call that can be used by the client service application (e.g. Excel add-in) to retrieve a list of properties defined for a specific dimension in one or more data stores (i.e. Applications).

GetFileFromLibrary

In some embodiments, the client service application comprises a report library service call operation that can be used by the client service application (e.g. Excel add-in) to extract a report/template from the report library and open it in the client service application (e.g. Excel).

GetFileLibrary

In some embodiments, the client service application comprises a report library service call operation that can be used by the client service application (e.g. Excel add-in) to retrieve a list of reports/templates from the report library to which the logged in user has access.

GetFileSharedUsers

In some embodiments, the client service application comprises a report library service call operation that can be used by the client service application (e.g. Excel add-in) to retrieve a list of users that have shared access for one or more reports/templates.

GetModelList

In some embodiments, the client service application comprises a metadata service call operation call that can be used by the client service application (e.g. Excel add-in) to retrieve a list of models defined for a specific one or more data stores (i.e. Applications) that the logged in user has been given access to based on their security settings.

GetSharedFiles

In some embodiments, the client service application comprises a report library service call operation that can be used by the client service application (e.g. Excel add-in) to retrieve a list of reports/templates from the report library to which the logged in user has been given shared access.

GetUserCV

In some embodiments, the client service application comprises a service call operation call that can be used by the client service application (e.g. Excel add-in) to retrieve the last current view settings for the logged in user for the specified data store (i.e. Application).

GetUsers

In some embodiments, the client service application comprises a service call operation call that can be used by the client service application (e.g. Excel add-in) to retrieve a list of users that have been granted access to the specified data store (i.e. Application).

GetVariableList

In some embodiments, the client service application comprises a service call operation call that can be used by the client service application (e.g. Excel add-in) to retrieve a list of user-defined variables defined for a specified data store (i.e. Application) and Model that can be used in reports or for business rules.

GetWebServiceVersion

In some embodiments, the client service application comprises a service call operation call that can be used by the client service application (e.g. Excel add-in) that can be called during the login process to retrieve the reporting service version. In some embodiments, other information may be returned from the call, such as the user's Display name and/or whether current logged in user is a System Administrator, among others.

LogonUserAccess

In some embodiments, the client service application comprises a service call operation call that can be used by the client service application (e.g. Excel add-in) that can be called during the login process to retrieves the actions permitted by the user within the client service application (e.g. Excel add-in) based on their security role settings defined. In some embodiments, client service application actions can include a report editor, save files to public shared library, send data, load data, run rule and/or clear data.

RemoveUserFromSharedFile

In some embodiments, the client service application comprises a report library service call operation that can be used by the client service application (e.g. Excel add-in) that allows a user to remove another user from the shared list on a personal Excel report/template in the application repository.

RuleActivityMonitor

In some embodiments, the client service application comprises a job monitoring service call operation that can be used by the client service application (e.g. Excel add-in) to report on the status of jobs submitted to the Business Rule engine. In some embodiments, the Business rule engine comprises, for example, a Windows service used for functions including, for example, Send Data, Data Manager Load, Data Manager Clear and/or Data Manager Business Rules RunReport In some embodiments, the client service application comprises a reporting service call operation that can be used by the client service application (e.g. Excel add-in) that can be initiated, by, e.g. a Refresh Worksheet or Workbook action in the client service application. In some embodiments, the report definition along with the user's current view selection are submitted to the reporting engine where a Dynamic DAX query/queries are executed, and the results are processed and returned to the add-in in an XML format, for example, and then rendered to the user in the client service application (e.g. Excel via the add-in). In some embodiments, the RunReport function comprises the functionality for initiating the dynamic generation of an analytical data report, as described herein.

SaveFiletoLibrary

In some embodiments, the client service application comprises a report library service call operation that can be used by the client service application (e.g. Excel add-in) to save a Report Definition/Input template to the Report Library on the user access point or on, for example, a main server system. In some embodiments, the repository is stored in a SQL table in an image data type field. In some embodiments, each data store (i.e. Application) has a separate repository.

SaveUserCV

In some embodiments, the client service application comprises a service call operation call that can be used by the client service application (e.g. Excel add-in) to save the current view settings for the logged in user for the specified data store (i.e. Application). In some embodiments, these setting can be retrieved when switching between applications or when first logging into the Application.

SubmitRequest

In some embodiments, the client service application comprises a service call operation call that can be used by the client service application (e.g. Excel add-in) performing Data Manager functions to Clear Data, Load Data or Run a Business Rule in a specific Application/Model. In some embodiments, this service may also be called by the Send Data operation from an Input template via the client service application (e.g. Excel add-in ribbon). In some embodiments, some or all submit requests are logged by the Reporting Service and queued to be processed by the Business Rule engine.

In some embodiments, the client service application comprises at least the above functionalities that can be initiated by a user. In some embodiments, the central component and functionality of the client service application may comprise the RunReport function for transmitting a report request to the reporting service and/or the report generator, as described herein.

In some embodiments, another process flow of the system may comprise an administrative (admin) service configured to model data (i.e. store and structure data for report generation. In some embodiments, the admin service may comprise a web service. In some embodiments, the admin service may function to create Applications (e.g. data stores), create new models within an Application, create new dimensions/hierarchies in a model, and/or set up security roles, among others. In some embodiments, the admin service comprises a dynamic user interface to facilitate the above functions. In some embodiments, the admin service may communicate application and model information to the client service application, for example, via the reporting service or other feature. In some embodiments, the admin service can be configured to set up and deploy an application, and comprise various functionalities for managing, editing, and deploying the application and/or model. In some embodiments, the admin service comprises at least the following functionalities:

CancelCheckout

In some embodiments, the admin service may comprise a Checkout function that locks a system object (e.g. dimension, list, business rule, security role, etc.) for some or all users, except the user who has checked out the object, so it can be edited. In some embodiments, CancelCheckout discards all changes to the object since the last check out and unlocks the object to make it available for Checkout again.

Checkin

In some embodiments, the admin service may comprise a CheckIn function to save any changes to the system object (e.g. dimension, list, business rule, security role, etc.) and unlocks the object as well.

Checkout

In some embodiments, the admin service may comprise a Checkout function to lock a system object (e.g. dimension, list, business rule, security role, etc.) so it can be edited by a single user or multiple users.

Convert2Tabular

In some embodiments, the admin service may comprise a function for converting an existing system Online Analytical Processing (OLAP) application to the new system structured tabular application format. In some embodiments, the conversion includes, for example, all dimension members, hierarchies, models, security roles and/or fact data.

CreateApplication

In some embodiments, the admin service may comprise a function for creating a new, empty Application.

CreateBusinessRule

In some embodiments, the admin service may comprise a function for creating a new business rule.

CreateBusinessRuleStep

In some embodiments, the admin service may comprise a function for creating a new step within a business rule.

CreateDimension

In some embodiments, the admin service may comprise a function for creating a new, empty dimension with a "None" member added.

CreateDynamicMember

In some embodiments, the admin service may comprise a function for creating a new, empty dynamic member. In some embodiments, a dynamic member comprises a member that has a DAX calculation statement attached to it and calculates at runtime in reporting.

CreateList

In some embodiments, the admin service may comprise a function for creating a new, empty List. In some embodiments, a list comprises a system-represented SQL table that allows for various customizations during deployment. Lists can be used in several ways in some embodiments. For example, lists can be used as part of an extract, transform, load (ETL) process to manage the SQL query from source systems, for mapping of metadata from source systems to the system, and for book publishing, among others.

CreateModel

In some embodiments, the admin service may comprise a function for creating a new, empty data model.

CreateSecurityRole

In some embodiments, the admin service may comprise a function for creating a new, empty security role.

CreateVariable

In some embodiments, the admin service may comprise a function for creating a new, empty variable. In some embodiments, variables are used to ease ongoing maintenance of the system by administrators or other users. For example, CreateVariable can be used for setting members for things like current month and drill-through, among others.

DeleteApplication

In some embodiments, the admin service may comprise a function for deleting a selected Application. In some embodiments, any Delete method listed here and below may require the object (e.g. application, model, list, etc.) to be checked-out before a Delete can be performed.

DeleteBusinessRule

In some embodiments, the admin service may comprise a function for deleting a selected business rule.

DeleteBusinessRuleParameters

In some embodiments, the admin service may comprise a function for deleting a selected business rule parameter.

DeleteBusinessRuleSteps

In some embodiments, the admin service may comprise a function for deleting a selected business rule step.

DeleteDimension

In some embodiments, the admin service may comprise a function for deleting a selected dimension of a model.

DeleteDynamicMember

In some embodiments, the admin service may comprise a function for deleting a selected dynamic member.

DeleteList

In some embodiments, the admin service may comprise a function for deleting a selected list.

DeleteModel

In some embodiments, the admin service may comprise a function for deleting a selected model.

DeleteSecurityRole

In some embodiments, the admin service may comprise a function for deleting a selected security role.

DeleteVariable

In some embodiments, the admin service may comprise a function for deleting a selected variable.

DeployApplication

In some embodiments, the admin service may comprise a function for storing, implementing and/or deploying all checked in changes to an object. In some embodiments, deploying an application may make the application available to end users for report requests and generation. In some embodiments, this process builds the Structured Query Language (SQL) Server Analysis Services (SSAS) tabular database based on any changes made, and defines security in the Analysis Services tabular database.

DeployBusinessRule

In some embodiments, the admin service may comprise a function for storing, implementing and/or deploying a business rule. In some embodiments, a business rule can be deployed without needing to deploy to full application.

DeployRoles

In some embodiments, the admin service may comprise a function for storing, implementing and/or deploying a security role. In some embodiments, a security role can be deployed without needing to deploy to full application.

GetAllDimensionHierarchyColumns

In some embodiments, the admin service may comprise a function for retrieving and/or displaying some or all dimension hierarchy information to use in a dimension tree view. In some embodiments, the dimensional tree view may comprise a visual or graphical representation of a dimensional tree. In some embodiments, the dimension tree view defines the dimensions and/or hierarchies (i.e. structure) available in the application. In some embodiments, some applications may be configured to include more than one dimension tree.

GetApplicationList

In some embodiments, the admin service may comprise a function for retrieving and/or displaying a complete list and/or sub list of applications.

GetApplicationModelAccess

In some embodiments, the admin service may comprise a function for retrieving and/or displaying a list of applications and models a user has access to.

GetBusinessRuleDimFilters

In some embodiments, the admin service may comprise a function for retrieving and/or displaying filters used in business rules for example.

GetBusinessRuleList

In some embodiments, the admin service may comprise a function for retrieving and/or displaying a list of existing business rules.

GetBusinessRuleStepParameters

In some embodiments, the system can be configured to show the list of Parameters within the steps of the chosen Business Rule.

GetBusinessRuleSteps

In some embodiments, the admin service may comprise a function for retrieving and/or displaying the list of steps within a selected business rule.

GetCheckoutList

In some embodiments, the admin service may comprise a function for retrieving and/or displaying a list of some or all objects that are checked out at a given time.

GetDimensionHierarchyList

In some embodiments, the admin service may comprise a function for retrieving and/or displaying a list of hierarchies within a selected dimension.

GetDimensionHierarchyMembers

In some embodiments, the admin service may comprise a function for retrieving and/or displaying a list of members within a selected hierarchy within a selected dimension.

GetDimensionList

In some embodiments, the admin service may comprise a function for retrieving and/or displaying a list of dimensions.

GetDimensionMembers

In some embodiments, the admin service may comprise a function for retrieving and/or displaying a list of members within a dimension.

GetDimensionProperties

In some embodiments, the admin service may comprise a function for retrieving and/or displaying a list of properties for each member within a dimension.

GetDynamicMemberList

In some embodiments, the admin service may comprise a function for retrieving and/or displaying a list of dynamic members for an application.

GetLibraryBusinessRuleList

In some embodiments, the admin service may comprise a function for retrieving and/or displaying a list of all possible business rules published into a business rules library.

GetLibraryBusinessRuleParameters

In some embodiments, the admin service may comprise a function for retrieving and/or displaying list of all parameters in a business rule.

GetListFields

In some embodiments, the admin service may comprise a function for retrieving and/or displaying a list of all fields within a selected list.

GetListMembers

In some embodiments, the admin service may comprise a function for retrieving and/or displaying populated records/fields within the chosen List.

GetLists

In some embodiments, the admin service may comprise a function for retrieving and/or displaying some or all lists that have been created in a selected application.

GetModelDimensionList

In some embodiments, the admin service may comprise a function for retrieving and/or displaying all dimensions that have been included in a selected model.

GetModelList

In some embodiments, the admin service may comprise a function for retrieving and/or displaying a list of all models within a selected application.

GetOLAPApplicationList

In some embodiments, the admin service may comprise a function for retrieving and/or displaying a list of existing system OLAP applications. In some embodiments, an existing OLAP application can be selected by an administrator or other user to be automatically converted to the new system Tabular application format.

GetOLAPDimensionProperties

In some embodiments, the admin service may comprise a function for retrieving and/or displaying a list of dimension properties from an existing OLAP application to be converted as part of the conversion process to the new system Tabular application format.

GetSecurityRoleBusinessRuleAccess

In some embodiments, the admin service may comprise a function for retrieving and/or displaying a list of business rules that each security role has access to.

GetSecurityRoleList

In some embodiments, the admin service may comprise a function for retrieving and/or displaying a list of security roles.

GetSecurityRoleMembers

In some embodiments, the admin service may comprise a function for retrieving and/or displaying a list of users to which each security role has access.

GetSecurityRoleModelAccess

In some embodiments, the admin service may comprise a function for retrieving and/or displaying a list of models to which each Security Role has access.

GetUsers

In some embodiments, the admin service may comprise a function for retrieving and/or displaying a list of all users who have been entered to have access to the system.

GetVariableList

In some embodiments, the admin service may comprise a function for retrieving and/or displaying a list of variables for a selected model.

GetWebServiceVersion

In some embodiments, the admin service may comprise a function for retrieving and/or displaying a version number of the current admin service and/or client application service.

Import

In some embodiments, the admin service may comprise a function for importing an Application XML file that was created via an export. In some embodiments, Import can be used, for example, to move an Application from one server to another.

LogonUserAccess

In some embodiments, the admin service may comprise a function for verifying a user's security access. For example, the function may begin immediately upon login.

ProcessModelData

In some embodiments, the admin service may comprise a function for reprocessing some or all Analysis Services Tabular data for a selected cube. In some embodiments, this function may be performed without needing to redeploy the application.

Rollback

In some embodiments, the admin service may comprise a function for discarding all changes made to an object since the last deployment and/or for unlocking the object to make it available for check out again.

UpdateBusinessRuleLibrary

In some embodiments, the admin service may comprise a function for updating the business rule library when custom/manual rules need to be included.

ValidateUsers

In some embodiments, the admin service may comprise a function for validating that a user attempting to log in to the system is an authorized user.

In some embodiments, the admin service and/or a modeler may configure some or all of the unstructured tabular data into an SQL server system comprising a plurality of data tables. In some embodiments, the tables comprise database objects functioning as containers and as logical organizational structures for the data. In some embodiments, the tables can be also used as a security mechanism, where database users can be granted permissions (e.g. security roles) at the table and/or database level.

In some embodiments, SQL server tables are contained within database object containers called schemas. In some embodiments, the tables of the systems, methods, and devices described herein are contained within one or more star schemas. In some embodiments, the schema may also function as a security boundary, wherein database user permissions (e.g. security roles) can be limited on a specific schema level. In some embodiments, the properties that are assigned to the tables and the rows/columns within the tables may control the allowed data types and data ranges that the table accepts. In some embodiments, the systems, devices, and methods described herein can enable optimization of table design to facilitate faster data storage and retrieval from the table.

In some embodiments, the tables of the systems, methods, and devices described herein are contained within one or more star schemas. A star schema may separate business process data into fact data, which may comprise measurable, quantitative data about a business, and dimensions which may comprise descriptive attributes related to the fact data. Examples of fact data may include sales price, sale quantity, time, distance, speed and/or weight measurements, among others. Related dimension attribute examples include, for example, product models, product colors, product sizes, geographic locations, and/or salesperson names.

In some embodiments, the admin service and/or modeler may deploy the application and process the application in the SQL server star schema to generate a data model in one or more SSAS Tabular databases comprising a tabular cube. In some embodiments, the data in the deployed star schemas and/or the SSAS Tabular databases are queried by the DAX query builder and/or report generator to dynamically generate a requested report from the client service application.

In some embodiments, the admin service and/or modeler stores business data in an application database which comprises definitions, dimensions, and/or other inputted data and/or metadata. In some embodiments, this application database comprises one or more FAT tables. In some embodiments, the data contained in the one or more FAT tables can be loaded into the tables by a download process or from, e.g., a Microsoft Excel input. In some embodiments, when the application is deployed, it is transmitted to analysis services tabular and is placed in an analysis queue. In some embodiments, some or all reporting is completed directly against the queue for performance or efficiency. In some embodiments, when the application is deployed, all of the data, including data regarding dimensions, hierarchies and other structure is included in the deployment.

In some embodiments, data such as, for example, raw data, metadata, and/or structured data, reporting data can be acquired through utilization of one or more application programming interfaces (APIs). In some embodiments, utilization of one or more APIs may allow the various services described herein to interface with each other and/or 3$^{rd}$ party services and applications. In some embodiments, one or more APIs are used to exchange data between a star schema, client service application, tabular database, reporting service, admin service, DAX query builder, report generator, workflow engine, data analysis (i.e. transactions) queue, and/or business logic/calculation engine, among others, to transfer data from one database and/or application to another.

In some embodiments, the underlying data store is altered and thus, the SQL Server star schema and/or the SSAS tabular database must be updated accordingly. In some embodiments, the alterations may be transmitted to a processing queue by, for example the admin service, the data analysis queue configured to process the data and update the relational database (e.g. SQL Server star schema) and/or the tabular database to reflect the changes.

In some embodiments, the systems devices, and methods described herein comprise operating two separate databases: a relational database or pseudo relational database and a tabular database. The systems devices, and methods described herein are configured to take advantage of the speed and scalability of a tabular database while reaping the additional analytical benefits of a relational database. In some embodiments, the system, methods, and devices herein are designed to configure a tabular database to perform like a more traditional relational database queue but retain the scalability and the end memory capability that is characteristic of traditional tabular databases. In some embodiments, the systems, methods, and devices described herein can facilitate the structuring of financial, business, and/or organizational data.

Generally, a traditional tabular database has no built-in ability to handle hierarchical data (i.e. structure) in a clean and efficient manner. There may be no current approach to managing hierarchies in a tabular database. In some embodiments, hierarchies may comprise a critical structure necessary to perform analytical functions on data. In some embodiments, the systems, methods, and devices described herein retroactively provide hierarchy to a tabular data set by building a multi-dimensional model or pseudo multi-dimensional model which is capable of being queried using dynamically constructed DAX queries and/or a set of preview pre-built queries. In some embodiments, the systems, methods, and devices described herein mimic the hierarchal structure of relational databases using a modified tabular database and using a tabular syntax. In some embodiments, the systems, devices, and methods described herein are related to a tabular database effectively having a form of a multi-dimensional data structure, thereby providing the functionality of a relational database using a modified tabular database that is capable of being queried by dynamically generated DAX queries in order to generate analytical data reports. In some embodiments, the DAX queries are automatically generated based on the properties, parameters, and/or definitions specified by a report request received through a client service application and/or specified within a data model via an admin service for example.

In some embodiments, the systems, methods, and devices herein comprise various embedded services. In some embodiments, the system may comprise a business rule engine for querying data based on a definition and generating FAT data based on the query. These business rule functions may comprise one or more of conversions, recalculation analogies, and/or financial intelligence services, among others.

In some embodiments, the system may comprise a work flow engine. In some embodiments, the work flow engine may be configured to send the work flow to various users to obtain authorization to proceed with report design, generation, and/or sharing.

Figure 1B:
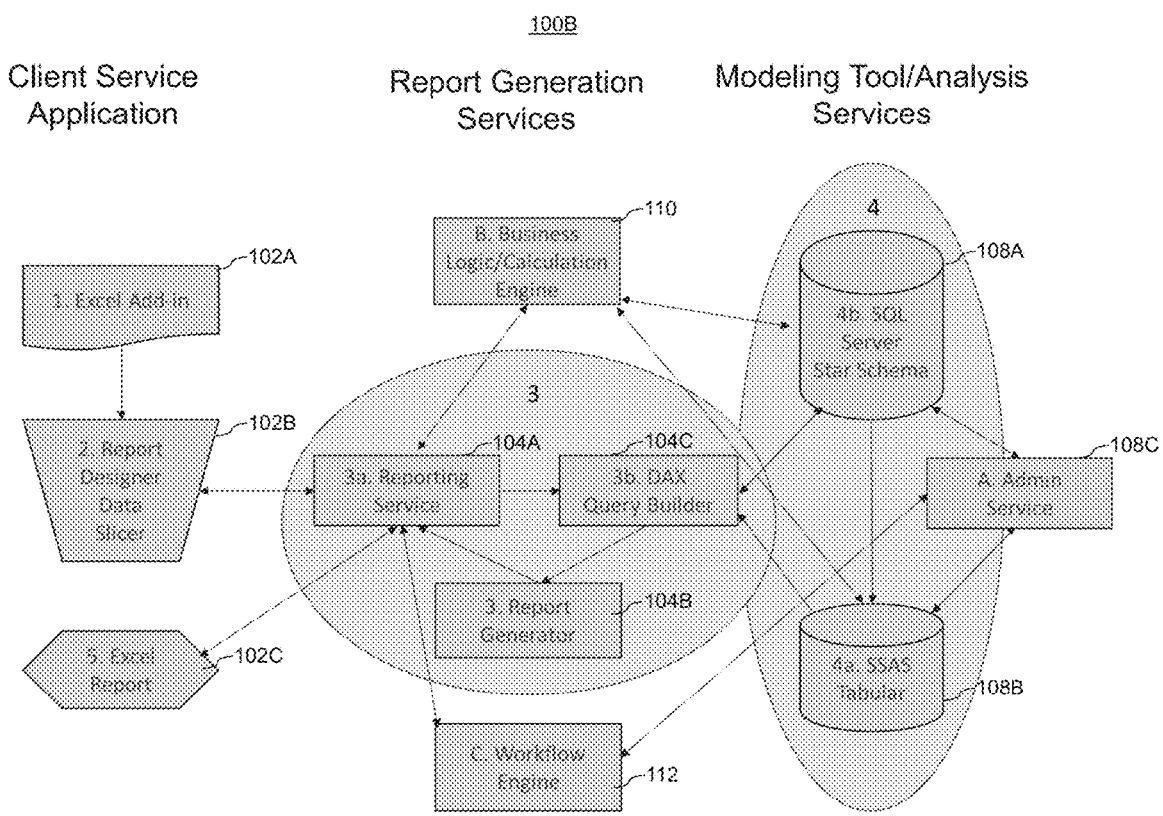
FIG. 1B is a block diagram illustrating detailed features of one or more embodiments of a data analysis system.

FIG. 1A is a block diagram illustrating features of one or more embodiments of a data analysis system 100A. FIG. 1B is a block diagram illustrating detailed features of one or more embodiments of the data analysis system 100B.

As illustrated in FIGS. 1A and 1B, in some embodiments, the system can comprise a client service application 102 comprising a user interface and/or tabular data engine in the form of an add-in 102A for Excel for example or any other tabular data engine.

For example, in certain embodiments, the client service application 102 and/or Excel add-in 102A or add-in for any other tabular data engine can act as the main interface for end-users to interact with the system. In some embodiments, the client service application 102 and/or Excel add-in 102A can allow users to login and/or use to create and generate reports. In certain embodiments, the user interface can further comprise an Excel ribbon that can be set up upon logging in. The client service application 102 and/or Excel add-in 102A can also be configured to take the results from report generation services 104 and render the output report 102C correctly in Excel or another tabular data engine. In other embodiments, one or more features of the add-in can be embedded in the tabular data engine itself; as such, the tabular data engine itself can act as an end-user interface for the system.

In some embodiments, the system 100 can comprise one or more additional components. For example, the system 100 can comprise a modeling component or tool 108, which can allow a user to create a tabular model based on dimensionality and/or maintain the model. In certain embodiments, creation of the tabular model can be provided as a behind-the-scenes service, and an application can maintain the model. The modeling tool 108 can be configured to deploy a requested application to analysis services 106, and the client service application 102 can communicate with a report generation services 104 that builds the appropriate queries to generate the report based on the type of reporting that was requested. In some embodiments, once the application is deployed, the application can reside in analysis services 106 under analysis services tabular.

In some embodiments, the client service application 102 can communicate with a report generation services 104 comprising, for example, a reporting service 104A, a report generator 104B, and/or a DAX query builder 104C. Once the client service application 102 is connected to the report generation services 104, or Reporting Service 104A thereof, the client service application 102 can be configured to have access to all or some of the models that were defined.

In some embodiments, the client service application 102 can comprise a Report Designer 102B. The Report Designer 102B can allow users to dynamically set up the structure of a report/template, such as rows, columns, slicers, filters, properties, or the like. The user selection can be saved to a server and used to dynamically build DAX queries to run against the tabular data, which can be sitting on the server for example, to generate a report based on the user selection. The user can slice and/or dice the data based on a plurality of variables and/or dimensions, including time, product, entity, region, account, budget forecast, time scenario, income statement, balance sheet, department, company, location, customer, employee, labor, sales, actuals, projects, asset, program, entity, and/or any other dimensions or variables that a report can be based on, for example in an enterprise resource planning (ERP) system or the like. As a non-limiting example, for a medical school or facility, some of such variables can include physician, procedure, case severity, and/or any other variable that a report can be based on for a medical school or facility. Further, as another non-limiting example, for an oil services company, some of such variables can include project, activity, customer, and/or any other variable that a report can be based on for such company.

In some embodiments, after receiving the user selection, the Report Designer 102B can then make a call to the reporting service 104A located at the main server system, which can build the queries, generate the report, and send the report back to the add-in, tabular data engine, browser, and/or other user interface, for example in XML format or the like.

In certain embodiments, the system can comprise a Report Generator 104B. The Report Generator 104B can be configured to report and/or input templates, take the structure of the report from the Report Designer 102B, and/or translate that into proper DAX queries to generate data. The Report Generator 104B can also be configured to utilize one or more slicers chosen in the current view for each dimension from the Excel ribbon. In certain embodiments, for budgeting/write-back, the Report Generator 104B can also act as a data submission template using the Reporting Service 104A to submit data back to the database.

In some embodiments, the Report Generator 104B can further comprise and/or be configured to work in conjunction with a Reporting Service 104A and/or a DAX query builder 104C. In certain embodiments, the Reporting Service 104A can be a web service that the Report Generator 104B connects with to properly pass information back to the Structured Query Language (SQL) Server Analysis Services (SSAS) tabular model 108B and/or Star Schema 108A, for example for lookup purposes. Further, in some embodiments, the DAX query builder 104C can be configured to take the information from the Reporting Service 104A and build the proper DAX queries for generating the report, for example based on the rules in the user slicing, which can include the types of features and/or report selected.

In certain embodiments, the system can comprise one or more databases, for example for performing analysis services in response to the Report Generator. For example, the one or more databases can comprise a SSAS Tabular Model 108B and/or a Relational Star Schema 108A. The SSAS Tabular Model 108B can refer to the "cube" based on a tabular structure. In certain embodiments, the model can be organized into one or more dimensions and/or hierarchies within those dimensions as identified by the Administrator interface, which can write information to the Relational Star Schema 108A. In some embodiments, this information in addition to the "Fact" data can then be processed into the SSAS Tabular Model 108B as a cube. Because of the many differences between the tabular cube and the more-traditional multi-dimensional cube, there can be a great deal of customization necessary to give the tabular cube the "structure" desired. The Relational Star Schema 108A can refer to a relational database that stores relevant information needed by the system. In some embodiments, the metadata can be generated through the Administrator interface and/or the integration with data sources, for example using SQL Server Integration Services (SSIS). The fact data likewise can be generated through integration with data sources, for example using SSIS and/or through submission of data via one or more system input templates.

In some embodiments, the system or the Report Generator 104B thereof can be configured to output a Report 102C rendered in Excel and/or an appropriate Report 102C for another tabular data engine and/or a browser. In certain embodiments, when the Excel workbook or other data file is saved, both the data generated by the report as well as the Report definition can be saved within the workbook, for example in each worksheet, allowing users to be able to close a report and easily re-open and regenerate results.

In some embodiments, the system can comprise an Admin Service 108C configured to be used by the Administrator interface to set up the structure of the database, dimensions, and/or hierarchies. Additionally, in certain embodiments, the Admin Service 108C can be used for setting up end-user security. In some embodiments, all interaction can be configured to be made via the Admin interface and all changes can be configured to be written to the Relational Star Schema database 108A and ultimately processed through to the SSAS Tabular Cube 108B. In certain embodiments, the Admin Service 108C can be used to set up business logic, calculations, and/or workflows.

In some embodiments, the system can comprise a Business Logic/Calculation Engine 110. The Business Logic/Calculation Engine 110 can be used by the system for procedural calculations in a library. For example, such procedural calculations can include, but not limited to, write-back(s) to the system (such as for budgeting and/or forecasting), foreign currency conversion, allocations, intercompany matching and/or eliminations, binary tuple calculations (such as addition, subtraction, multiplication, division), copying data from one tuple to another, MDX and/or DAX to fact data, and/or other custom calculations (for example per customer requirements). In some embodiments, SQL stored procedures and/or DAX can be used to create the structure of the calculation, with the add-in or tabular data engine product providing a more user-friendly interface for users to be able to set up these calculations within the Administrator interface. In certain embodiments, one or more of these calculations can be called on-demand from either the Excel or Admin interfaces. One or more these calculations can also be run automatically upon a trigger. One example of a use case can comprise submitting data into a budget template in local currency and then having the calculation engine automatically calculate the translation to USD.

In certain embodiments, the system can comprise a Workflow Engine 112. The Workflow Engine 112 can be used to capture approvals throughout processes, such as a budget or forecast cycle for example. In some embodiments, the Workflow can be set up in the Admin interface. In certain embodiments, within the Excel add-in 102A, there can be a reference to what a user is responsible for. As a non-limiting example, one use case for this can comprise a user entering their budget for their department (or company, location, or the like) and then submitting it for approval when they are complete. The user's "approver" can then be notified of a task to review what the inputter submitted and either approve or reject it. In some embodiments, the status of a workflow(s) can also be stored within the system.

Figure 2:
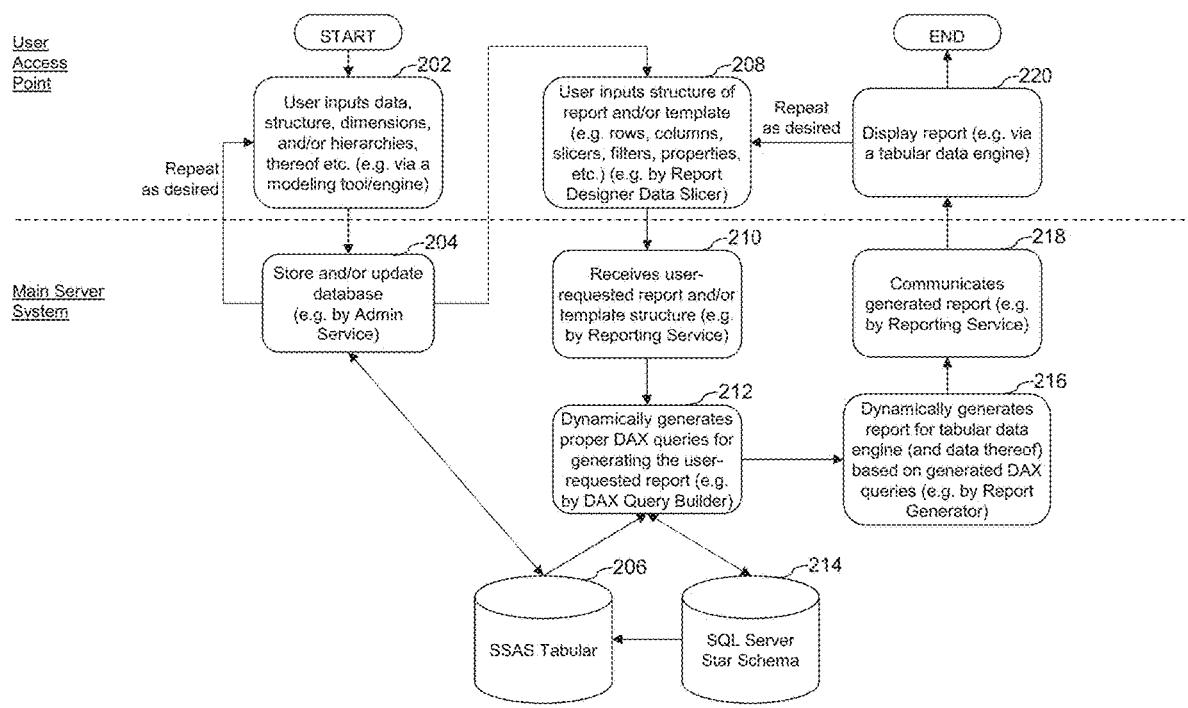
FIG. 2 is a block diagram illustrating features of one or more embodiments of a data analysis method.

FIG. 2 is a block diagram illustrating features of one or more embodiments of a data analysis method. As illustrated in FIG. 2, in some embodiments, a main server system can be configured to communicate with a user access point system to process one or more data analytical processes as requested by a user. For example, in some embodiments, the user can input data and/or one or more structures, dimensions, and/or hierarchies thereof via a user access point system at block 202. In certain embodiments, the system can comprise a user interface for inputting such data and/or one or more structures, dimensions, and/or hierarchies thereof, wherein the user interface can be an add-in for and/or itself comprise a tabular data engine, such as Microsoft Excel. In certain embodiments, the user-inputted data, structure, dimensions, and/or hierarchies thereof can be stored and/or updated in a database at block 204. For example, in some embodiments, an Admin Service can be configured to store and/or update such data in a SSAS Tabular database 206. In some embodiments, one or more processes described in connection with blocks 202 and 204 can be repeated as necessary, for example when a user inputs additional data and/or information relating to the structure, such as for example new sales data, new employee records, financial data, human resources data, budget data, forecast data, or the like.

In some embodiments, a user can input, via a user access point system, one or more desired criteria for generating a report at block 208, such as selection of a desired structure and/or template of a report. For example, the desired criteria for a report can comprise characteristics relating to the rows, columns, slicers, filters, properties, and/or the like of a report. In certain embodiments, the user interface for the system can comprise a Report Designer Data Slicer for allowing a user to input the user's desired criteria for report generation.

In certain embodiments, the user access point system can transmit the user-inputted report generation criteria to the main server system, which can receive the request at block 210. For example, the received user request can comprise information relating to the user-desired report and/or template structure. In some embodiments, the main server system can comprise a Reporting Service that communicates with the user access point system and/or a user interface thereof, such as an add-in to a tabular data engine.

In some embodiments, based on the received user criteria, the system can be configured to dynamically generate and/or build the proper queries, such as DAX queries, for generating the user requested report at block 212. In certain embodiments, the main server system can comprise a DAX Query Builder for building such DAX queries. In some embodiments, as part of and/or after building the DAX queries, a DAX Query Builder of the system can be in communication with one or more databases, such as an SSAS Tabular database 206 and/or an SQL Server Star Schema 214. The SQL Server Star Schema 214 can provide the relevant relational data needed by the DAX Query Builder to build the proper DAX queries, whereas the SSAS Tabular database 206 can provide the data. In some embodiments, the data in the SSAS Tabular database 206 can be organized into dimensions and/or hierarchies, which can be written to the SQL Server Star Schema 214 as a cube.

In certain embodiments, the system can be further configured to dynamically generate the user-requested report at block 216. For example, the system can be configured to generate a report for a tabular data engine based on the DAX queries. In some embodiments, the system can comprise a Report Generator for generating the report. In some embodiments, the system can be configured to generate a report for a tabular data engine, such as Microsoft Excel. The generated report can be transmitted by the main server system to the user access point system at block 218. For example, in some embodiments, a Reporting Service of the main server system can communicate the generated report. After receiving a generated report from the main server system, the report can be displayed to the user via the user access point system at block 220. For example, the generated report can be viewable via a tabular data engine. In some embodiments, one or more processes described in relation to blocks 208 through 220 can be repeated as desired, such as for generating one or more reports.

Figure 3:
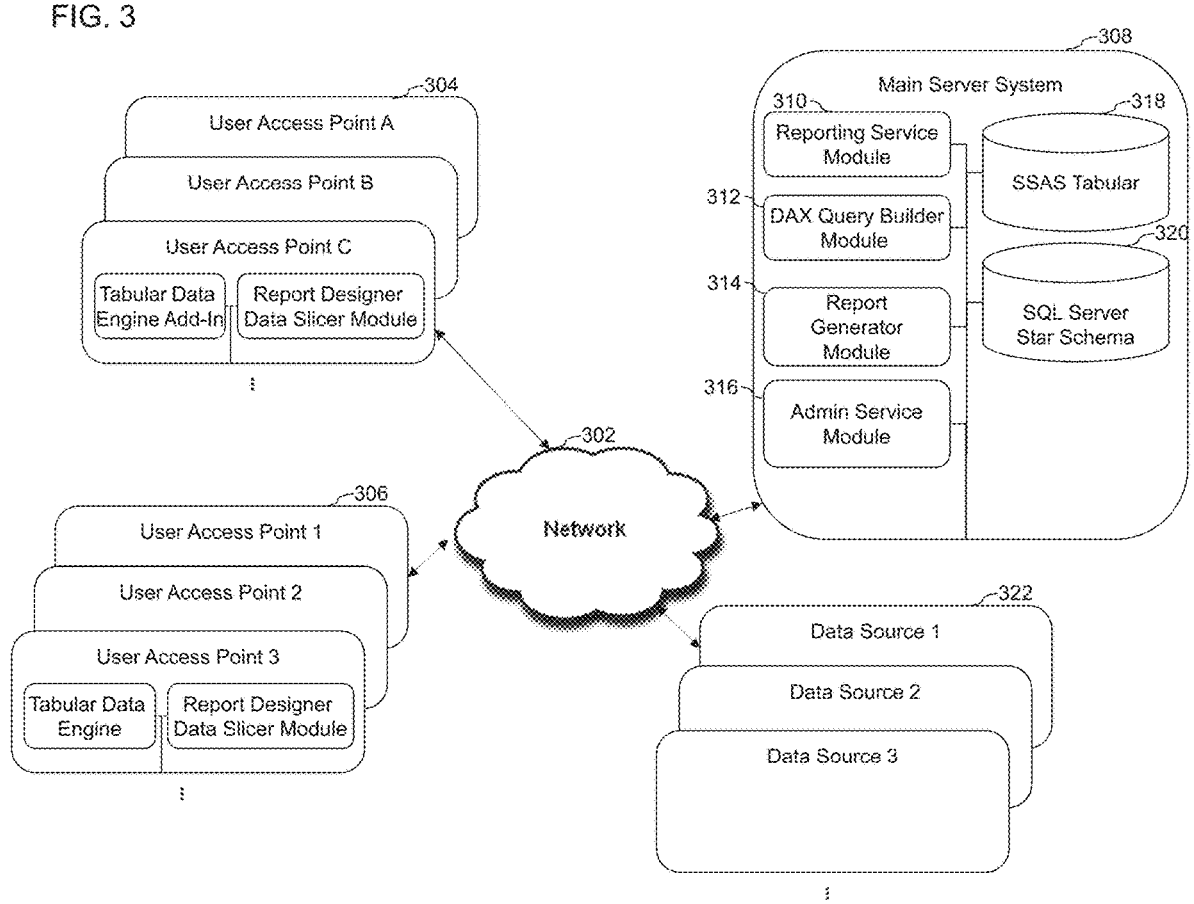
FIG. 3 is a block diagram illustrating features of one or more embodiments of a data analysis system.

FIG. 3 is a block diagram illustrating features of one or more embodiments of a data analysis system. As illustrated, in some embodiments, a main server system 308 can comprise one or more of a reporting service module 310, a DAX query builder module 312, a report generator module 314, an admin service module 316, an SSAS tabular database 318, and/or an SQL server star schema database 320. The main server system can be connected to a network 302. The network can be configured to connect the main server to one or more user access point systems 304, 306. Some user access point systems 306 can comprise a tabular data engine and/or a report designer data slicer module. Certain user access point systems 304 can comprise a tabular data engine add-in and/or a report designer data slicer module. The network can also be configured to connect the main server and/or the one or more user access points 304, 306 to one or more data sources 322.

The reporting service module 310 may function by providing one or more reporting services and/or other related functions as described herein. The DAX query builder module 312 may function by building DAX queries and/or other related functions as described herein. The report generator module 314 may function by generating reports and/or other related functions as described herein. The administrative service module 316 may function by providing one or more administrative services or other related functions as described herein. The SSAS tabular database 318 may provide a collection of all or some data, structures, and/or hierarchies. The SQL server star schema 320 may provide a collection of all or some relational data.

Figure 4:
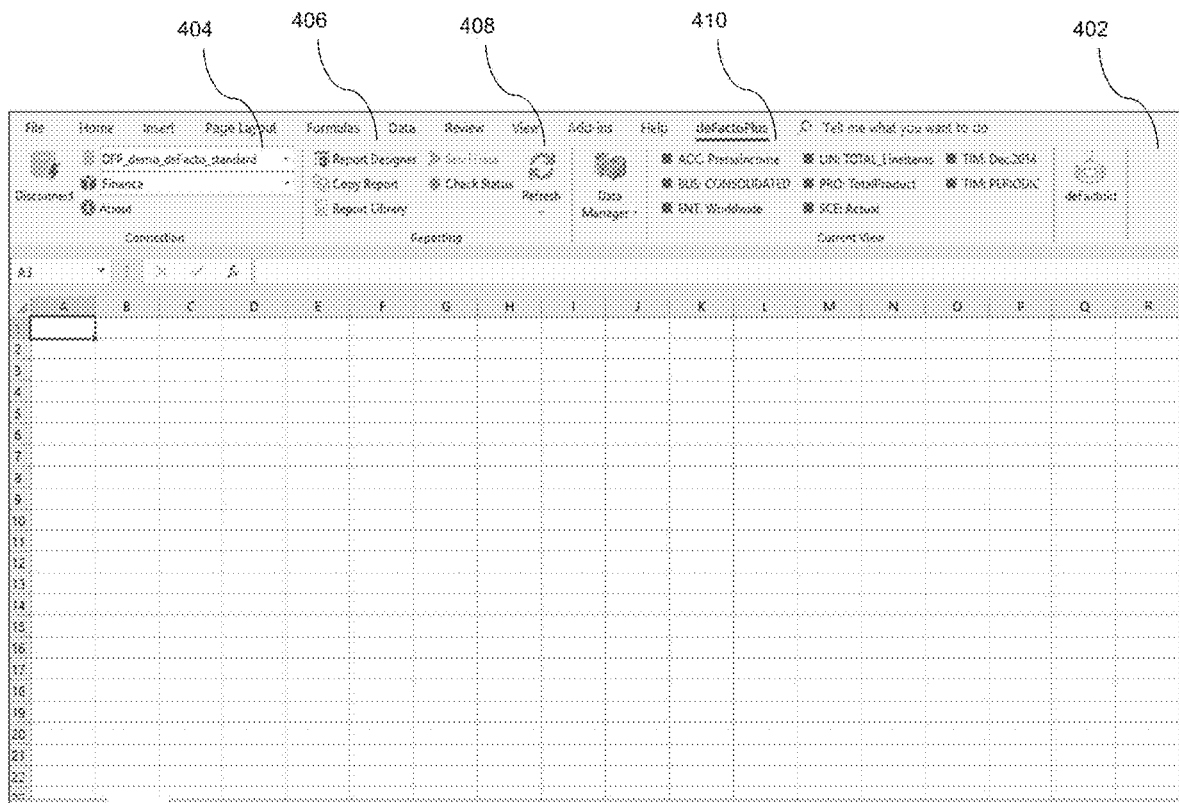
FIG. 4 illustrates an embodiment of a user interface of a data analysis add-in comprising a report designer data slicer, wherein the data analysis add-in is configured for use in conjunction with a tabular data engine.

FIG. 4 illustrates an embodiment of a user interface of a data analysis add-in comprising a Report Designer Data Slicer, wherein the data analysis add-in is configured for use in conjunction with a tabular data engine, such as Microsoft Excel. The data analysis add-in may comprise an Excel ribbon 402 comprising application and model selectors 404. The ribbon may also comprise a report designer launcher 406 for launching the report designer, as described herein. The ribbon 402 may also comprise a refresh mechanism 408 configured to refresh and/or update a selected report, as described herein. The ribbon 402 may also comprise a current view tab 410 displaying a list of filters, dimensions, hierarchies, attributes, and/or other properties of the current data view.

Figure 5:
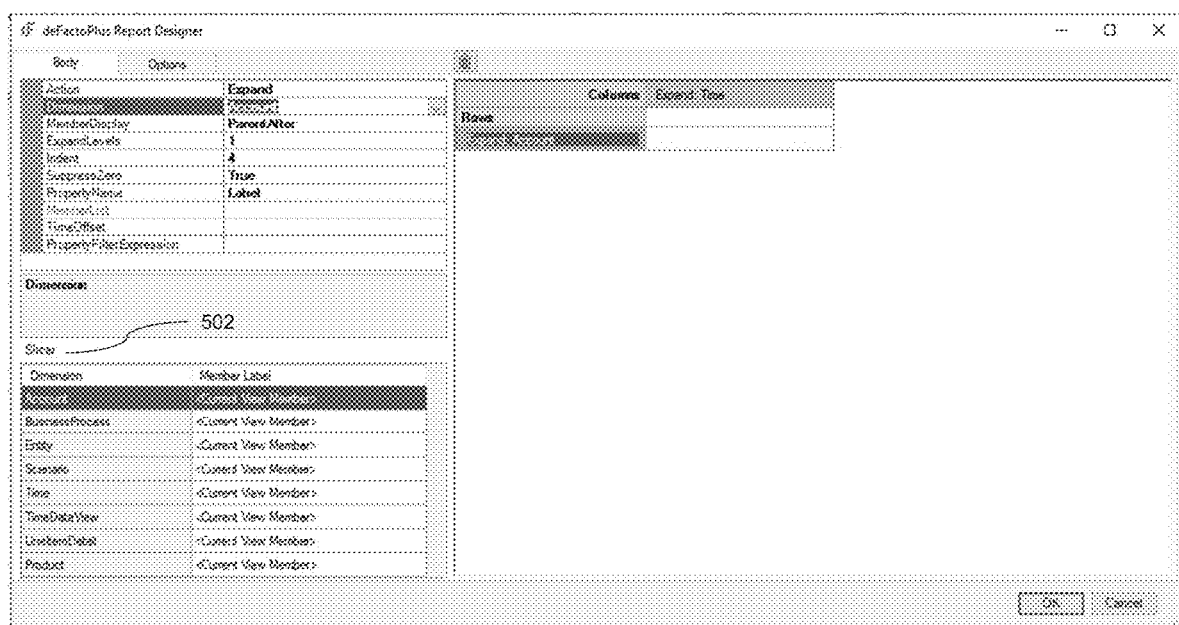
FIG. 5 illustrates an embodiment of a report designer user interface of one or more data analysis systems, methods, and devices.

FIG. 5 illustrates an embodiment of a Report Designer 500 user interface of one or more data analysis systems, methods, and devices. The report designer 500 may comprise a data slicer 502 for dynamically setting up the structure of a report/template, such as rows, columns, slicers, filters, properties, dimensions, or the like. In some embodiments, the report designer 500 may also allow input of one or more dimensions and/or hierarchies to be included in the analytical data report. In some embodiments, the client service application can be configured to launch the report designer 500. In some embodiments, the report designer 500 comprises a web service that is connected to the client service application. In some embodiments, the client service application comprises a report designer 500, wherein the client service application and report designer 500 are configured to access one or more data applications for which a report can be generated.

Figure 6:
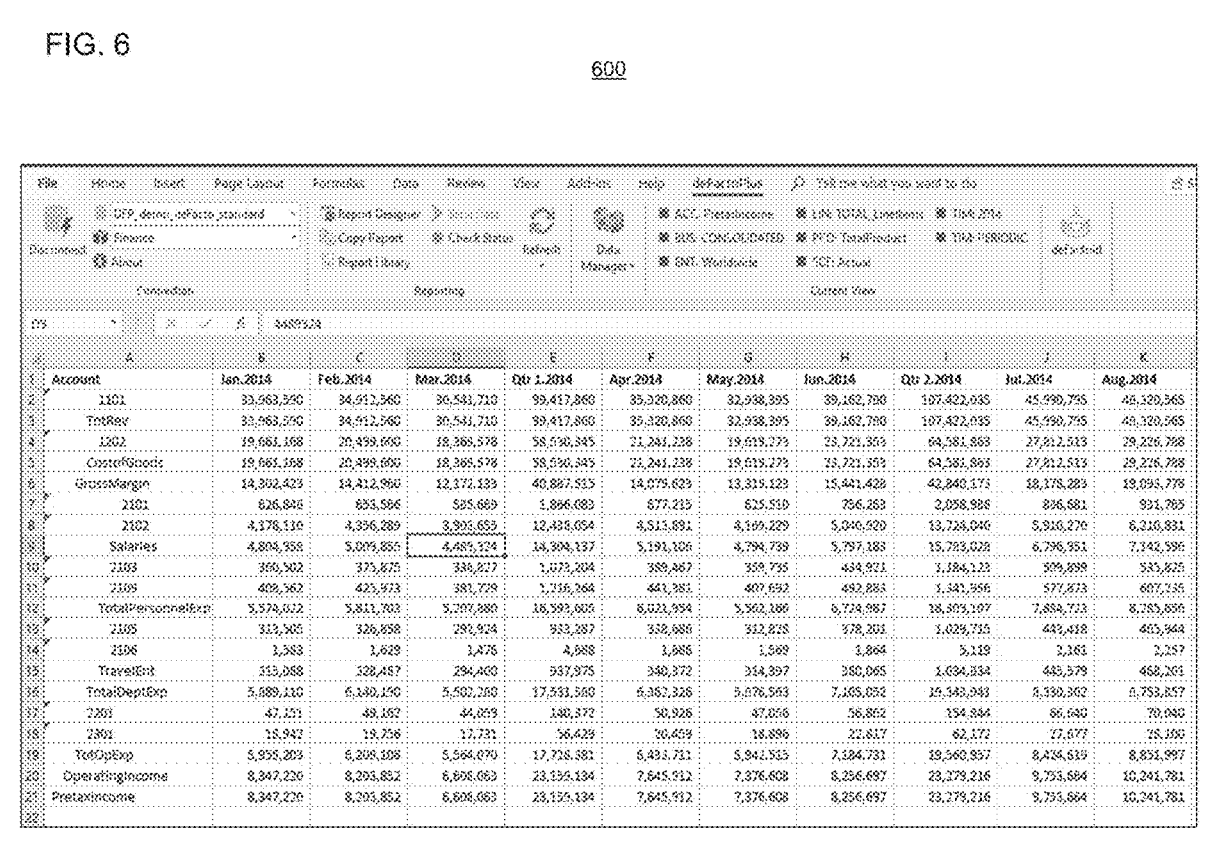

FIG. 6 illustrates example report 600 generated by a data analysis system for a tabular data engine, such as Microsoft Excel. In some embodiments, the systems, methods, and devices herein can be configured to render the requested analytical report 600 within the client service application. In some embodiments, the analytical report 600 can be rendered in Excel and/or an appropriate tabular data engine and/or a browser. In some embodiments, the format of analytical report 600 may reflect the inputted one or more dimensions and/or hierarchies, as well as the rows, columns, slicers, filters, properties, or the like inputted into the report designer.

Figure 7:
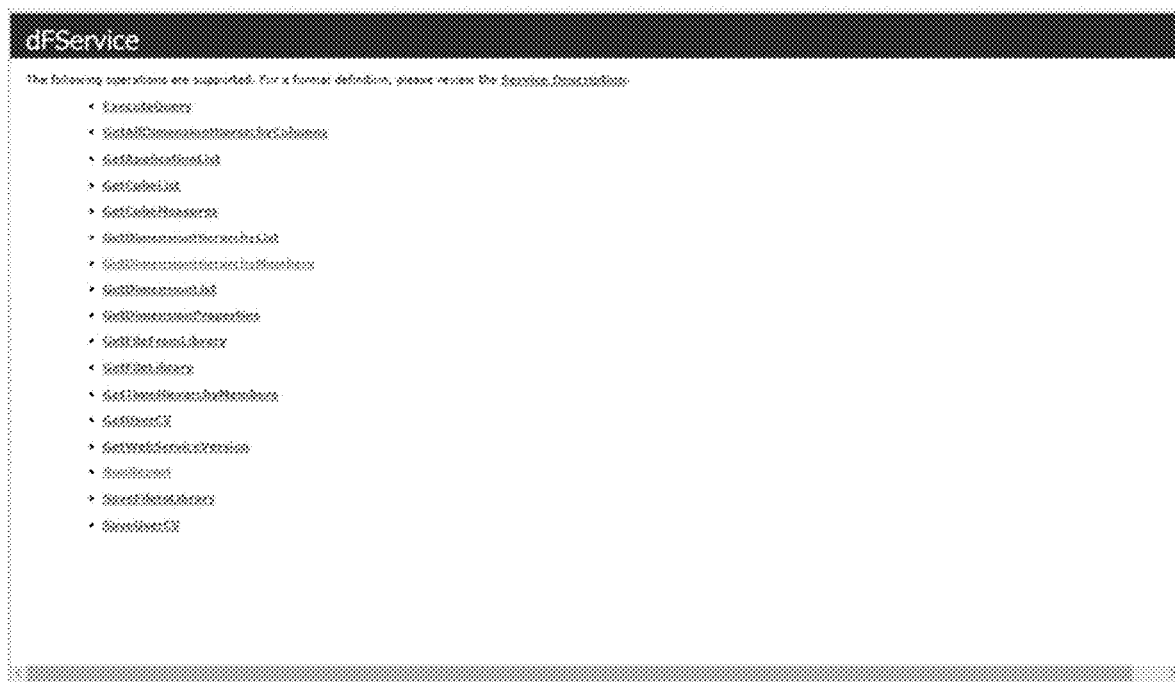
FIG. 7 illustrates an embodiment of a user interface listing one or more reporting services of a data analysis system.

FIG. 7 illustrates an embodiment of a user interface listing one or more functionalities of a data analysis system. Some embodiments of the various functionalities of the systems, methods, and devices are described above.

Figure 8:
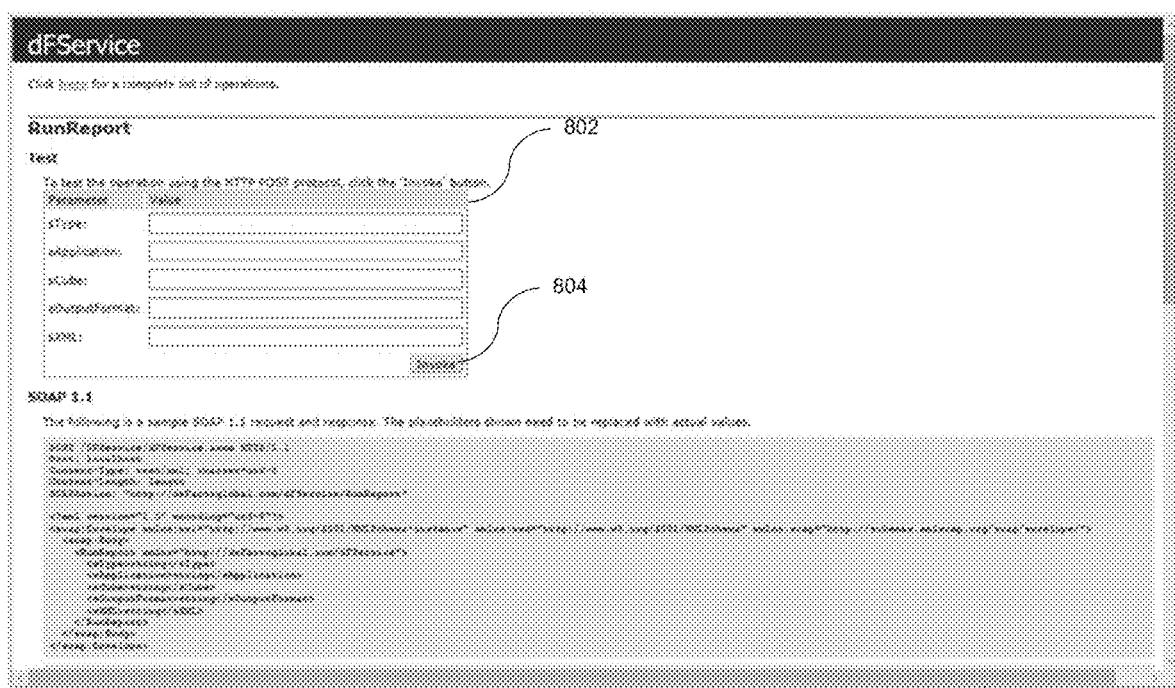
FIG. 8 illustrates an embodiment of a user interface of a run report service call of a data analysis system.

FIG. 8 illustrates an embodiment of a user interface 800 of a Run Report Service Call of a data analysis system. In some embodiments, the client service application comprises a RunReport reporting service call operation that can be used by the client service application (e.g. Excel add-in) that can be initiated, by, for example, a Refresh Worksheet or Workbook action in the client service application. In some embodiments, the report definition along with the user's current view selection are submitted to the reporting engine where a Dynamic DAX query/queries are executed, and the results are processed and returned to the add-in in an, e.g. XML format and then rendered to the user in the client service application (e.g. Excel via the add-in). In some embodiments, the RunReport function comprises the functionality for initiating the dynamic generation of an analytical data report, as described herein. In some embodiments, the Run Report user interface comprises various data fields 802 for inputting the type, application, model, output format, and XML for the requested report. In some embodiments, the RunReport call can be initiated by a user selection of an "invoke" mechanism 804.

Figure 9:
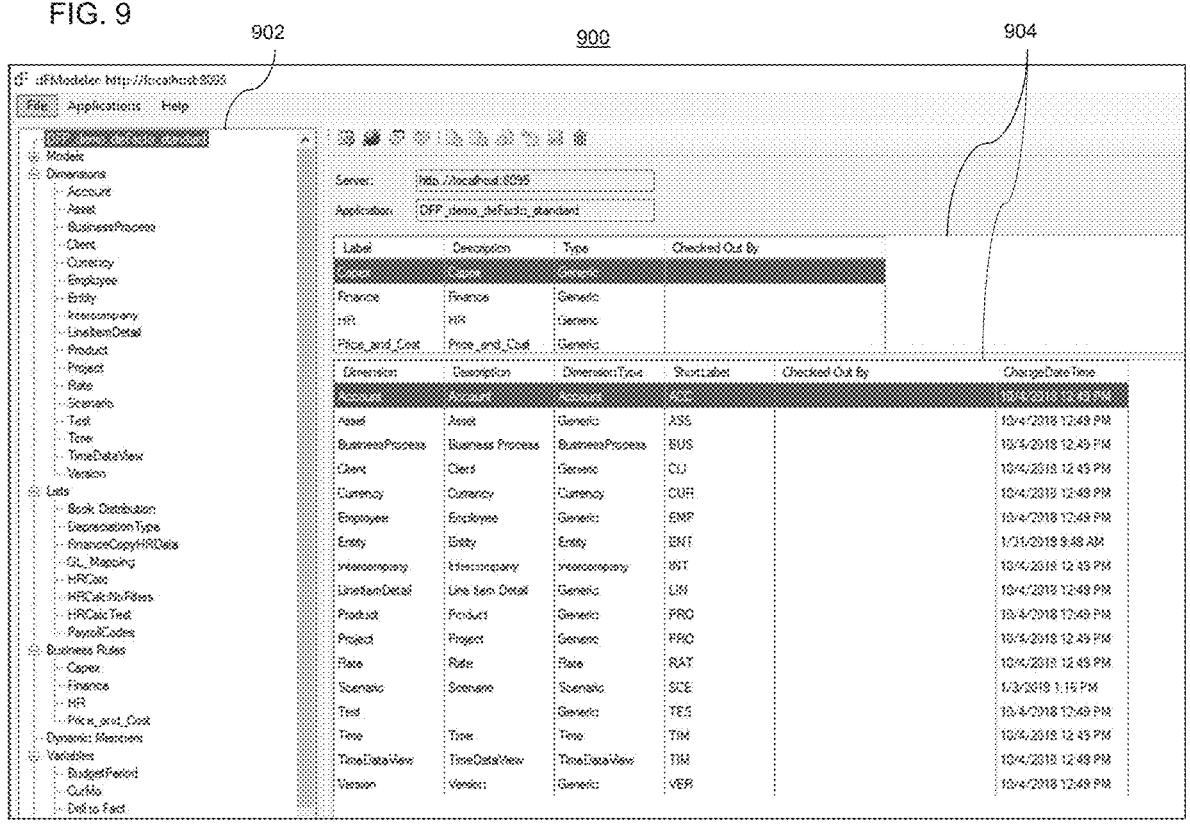
FIG. 9 illustrates an embodiment of a user interface of a modeling tool of a data analysis system.

FIG. 9 illustrates an embodiment of a user interface 900 of a Modeling Tool of a data analysis system. In some embodiments, the user interface 900 comprises a selection file structure 902 for selecting and editing the applications, models, and/or dimensions stored in the modeling tool. The user interface 900 may also comprise one or more viewing windows 904 for viewing and/or editing various properties of the applications, models, and/or dimensions, including, for example, label, description, model type, text support, Enable Audit Log, Change Info, type, and/or Check Out By properties, among other.

Figure 10:
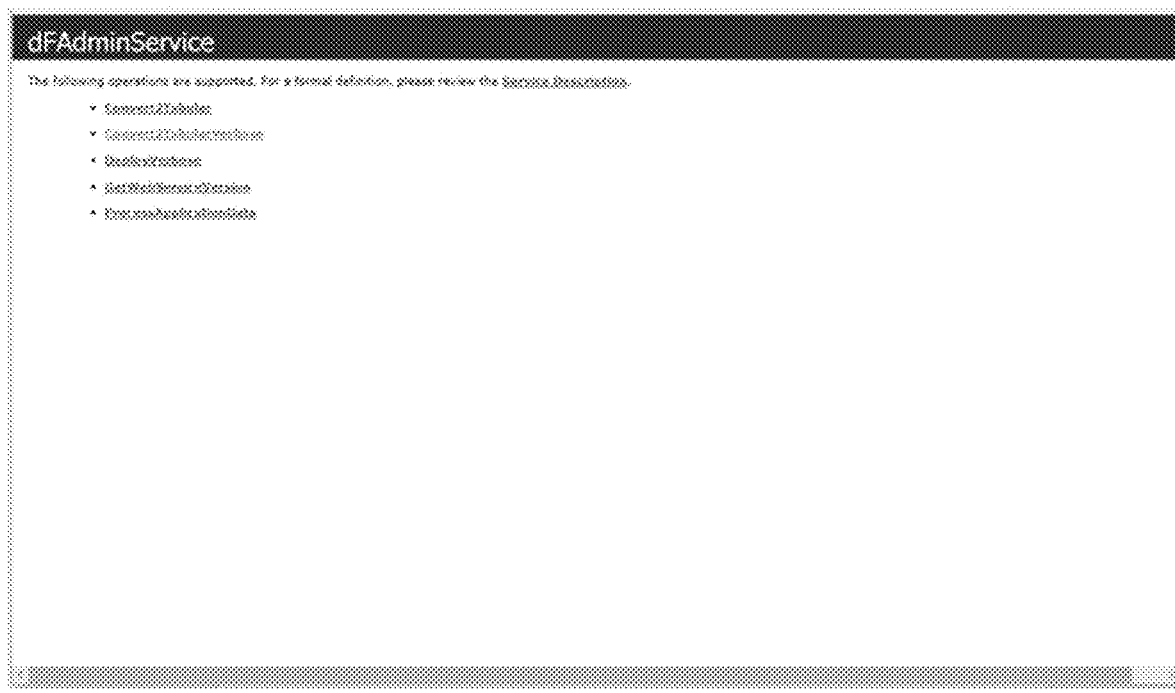
FIG. 10 illustrates an embodiment of a user interface showing administrative services of a data analysis system.

FIG. 10 illustrates an embodiment of a user interface showing Administrative Services of a data analysis system. In some embodiments, the admin service may comprise one or more functionalities, as described in detail above.

Figure 11:
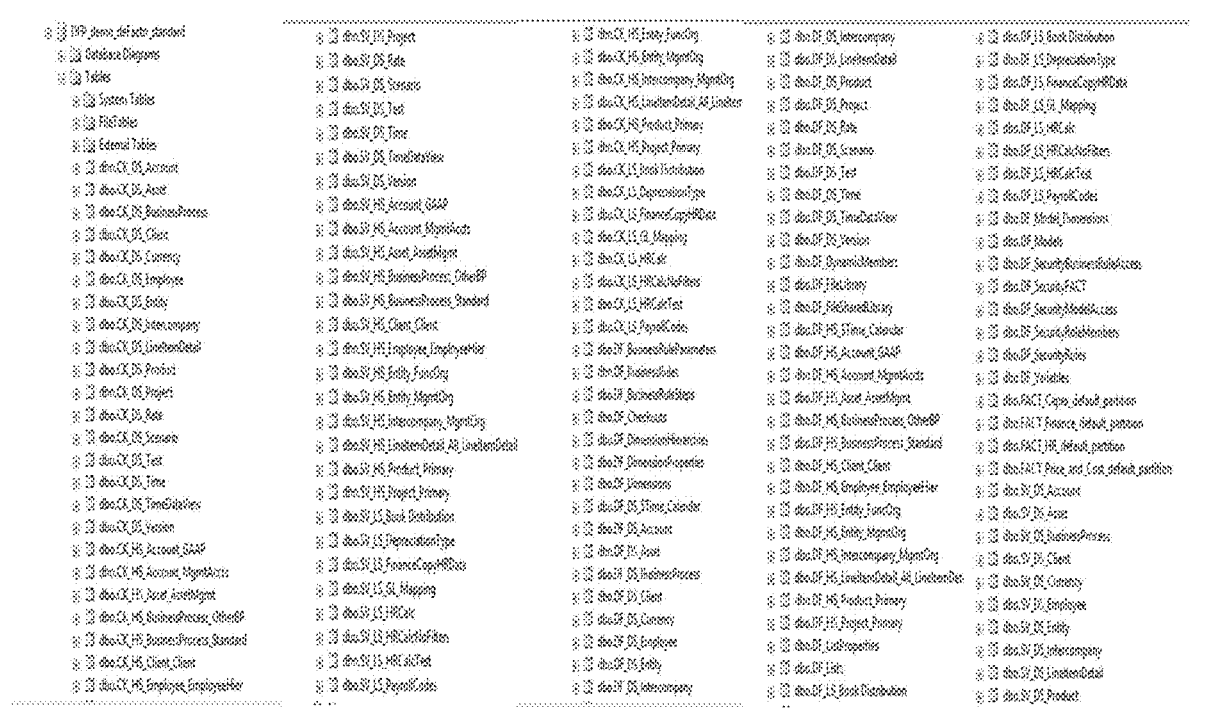

FIG. 11 illustrates an embodiment of a user interface listing example SQL server application definition tables, which can be stored in the Star Schema for example. In some embodiments, the star schema comprises one or more tables, including, for example, analysis-specific data tables, which may be highly structured and designed to inform specific and currently relevant information needs. In some embodiments, the admin service and/or a modeler may configure some or all of the unstructured tabular data into an SQL server system comprising a plurality of data tables. In some embodiments, the tables comprise database objects functioning as containers and as logical organizational structures for the data. In some embodiments, the tables can be also used as a security mechanism, where database users can be granted permissions (e.g. security roles) at the table and/or database level.

In some embodiments, SQL server tables are contained within database object containers called schemas. In some embodiments, the tables of the systems, methods, and devices described herein are contained within one or more star schemas. In some embodiments, the schema may also function as a security boundary, wherein database user permissions (e.g. security roles) can be limited on a specific schema level. In some embodiments, the properties that are assigned to the tables and the rows/columns within the tables may control the allowed data types and data ranges that the table accepts. In some embodiments, the systems, devices, and methods described herein can enable optimization of table design to facilitate faster data storage and retrieval from the table.

Figure 12:
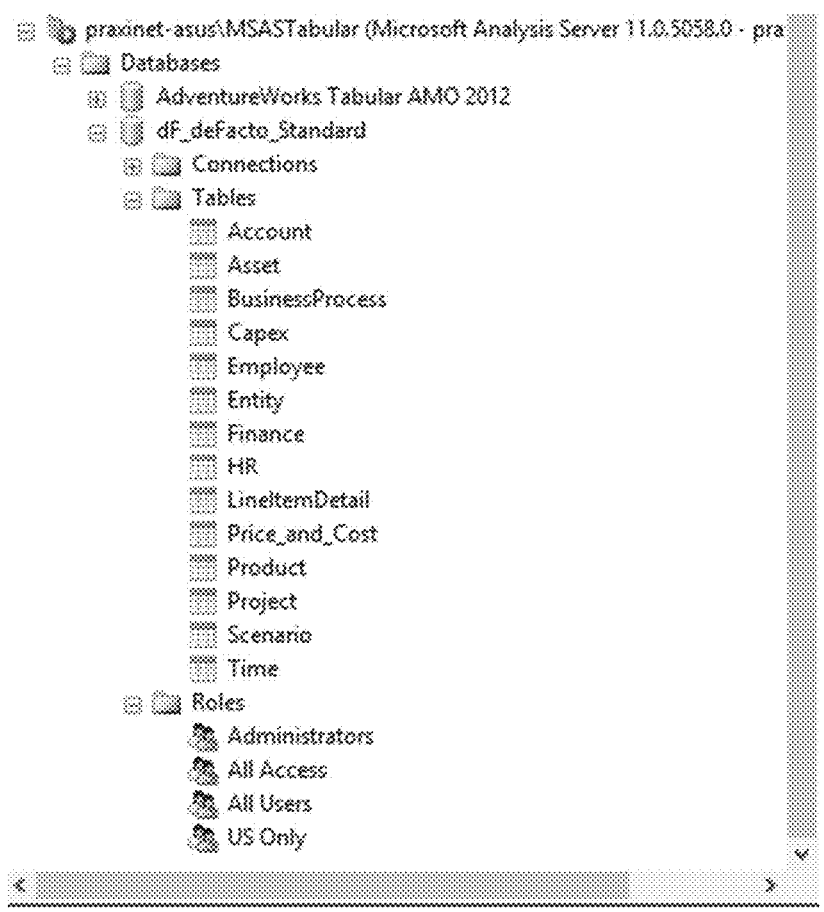
FIG. 12 illustrates an embodiment of a user interface listing example deployed applications to analysis services tabular of a data analysis system.

FIG. 12 illustrates an embodiment of a user interface listing example deployed applications to analysis services tabular of a data analysis system. In some embodiments, the admin service can be configured to set up and deploy an application, and comprise various functionalities for managing, editing, and deploying the application and/or model. In some embodiments, deploying an application may make the application available to end users for report requests and generation. In some embodiments, this process builds the Structured Query Language (SQL) Server Analysis Services (SSAS) tabular database based on any changes made, and defines security in the Analysis Services tabular database.

Computer System

Figure 13:
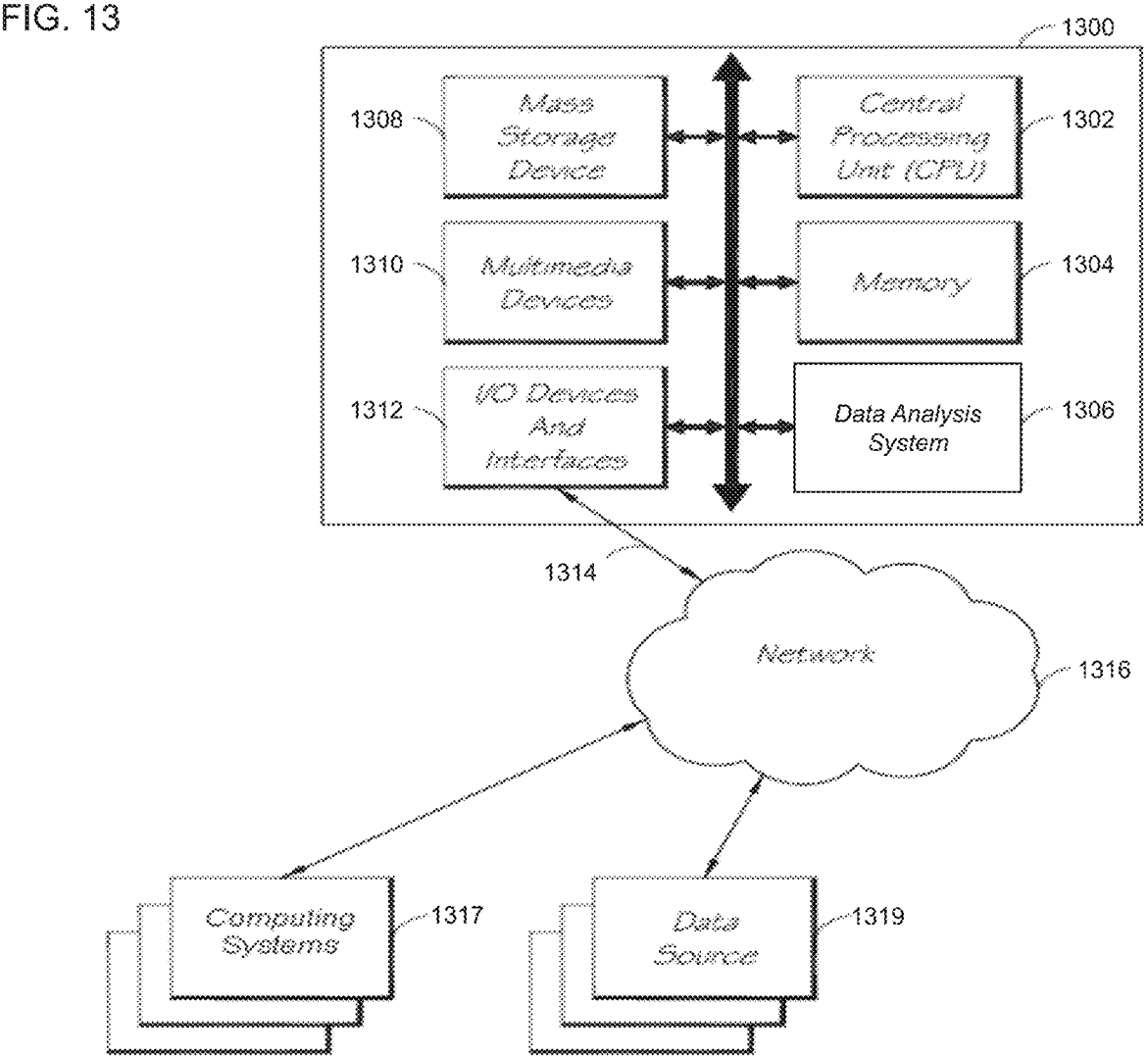
FIG. 13 is a block diagram illustrating a computer hardware system configured to run software for implementing one or more embodiments of data analysis systems, methods, and devices.

In some embodiments, the systems and methods described herein are implemented using a computing system, such as the one illustrated in FIG. 13. FIG. 13 is a block diagram illustrating a computer hardware system configured to run software for implementing one or more embodiments of a data analysis system according to some embodiments.

While FIG. 13 illustrates one embodiment of a computing system 1300, it is recognized that the functionality provided for in the components and modules of computing system 1300 may be combined into fewer components and modules or further separated into additional components and modules.

Data Analysis System Module

In some embodiments, the computing system 1300 comprises a data analysis system module 1306 that carries out the functions described herein, including any one of techniques described above. The data analysis system module 1306 and/or other modules may be executed on the computing system 1300 by a central processing unit 1302 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into submodules despite their physical organization or storage.

Computing System Components

In one embodiment, the computing system 1300 also comprises a mainframe computer suitable for controlling and/or communicating with large databases, performing high volume transaction processing, and generating reports from large databases. The computing system 1300 also comprises a central processing unit ("CPU") 1302, which may comprise a conventional microprocessor. The computing system 1300 further comprises a memory 1304, such as random access memory ("RAM") for temporary storage of information and/or a read only memory ("ROM") for permanent storage of information, and a mass storage device 1308, such as a hard drive, diskette, or optical media storage device. Typically, the modules of the computing system 1300 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1300 comprises one or more commonly available input/output (I/O) devices and interfaces 1312, such as a keyboard, mouse, touchpad, and printer. In one embodiment, the I/O devices and interfaces 1312 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 1312 comprise a microphone and/or motion sensor that allow a user to generate input to the computing system 1300 using sounds, voice, motion, gestures, or the like. In the embodiment of FIG. 13, the I/O devices and interfaces 1312 also provide a communications interface to various external devices. The computing system 1300 may also comprise one or more multimedia devices 1310, such as speakers, video cards, graphics accelerators, and microphones, for example.

Computing System Device/Operating System

The computing system 1300 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 1300 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 1300 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 13, the computing system 1300 is coupled to a network 1316, such as a LAN, WAN, or the Internet, for example, via a wired, wireless, or combination of wired and wireless, communication link 1314. The network 1316 communicates with various computing devices and/or other electronic devices via wired or wireless communication links. In the embodiment of FIG. 13, the network 1316 is communicating with one or more computing systems 1317 and/or one or more data sources 1319.

Access to the data analysis system module 1306 of the computer system 1300 by computing systems 1317 and/or by data sources 1319 may be through a web-enabled user access point such as the computing systems' 1317 or data source's 1319 personal computer, cellular phone, smartphone, laptop, tablet computer, e-reader device, audio player, or other device capable of connecting to the network 1316. Such a device may have a browser module that is implemented as a module that uses text, graphics, audio, video, and other media to present data and to allow interaction with data via the network 1316.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 1312 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1300 may comprise a physical or logical connection established between a remote microprocessor and a mainframe host computer for the express purpose of uploading, downloading, or viewing interactive data and databases on-line in real time. The remote microprocessor may be operated by an entity operating the computer system 1300, including the client server systems or the main server system, an/or may be operated by one or more of the data sources 1319 and/or one or more of the computing systems 1317. In some embodiments, terminal emulation software may be used on the microprocessor for participating in the micro-mainframe link.

In some embodiments, computing systems 1317 who are internal to an entity operating the computing system 1300 may access the data analysis system module 1306 internally as an application or process run by the CPU 1302.

URLs and Cookies

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Other Systems

In addition to the systems that are illustrated in FIG. 13, the network 1316 may communicate with other data sources or other computing devices. The computing system 1300 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

OTHER EMBODIMENTS

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A computer-implemented method for generating an analytical report using one or more tabular databases queryable by one or more Data Analysis Expressions (DAX), wherein the one or more tabular databases are generated from one or more unstructured data stores, the computer-implemented method comprising:

receiving, via a dynamic user interface of a client service application, one or more structural component inputs of an analytical report, wherein the one or more structural component inputs comprise one or more requested data dimensions and/or one or more hierarchies within the one or more requested data dimensions, wherein the dynamic user interface is launched via a spreadsheet application or a web browser;

transmitting the one or more structural component inputs to a reporting service, wherein the reporting service acts as a link between the client service application and a report generator;

constructing, by the report generator, in conjunction with a DAX query builder, one or more DAX queries based on the received one or more structural component inputs of the requested analytical report;

querying the one or more tabular databases using the one or more constructed DAX queries, wherein the one or more tabular databases comprise a Server Analysis Services (SSAS) tabular model and provide at least one functionality of a relational data structure and at least one functionality of a tabular data structure, wherein the Server Analysis Services (SSAS) tabular model is structured to be queried by the one or more DAX queries, and wherein the one or more tabular databases comprise a tabular cube operating within a Microsoft Structured Query Language (SQL) Server, wherein the tabular cube is constructed by retroactively transforming and separating the one or more unstructured data stores accessible by the Microsoft Structured Query Language (SQL) Server into fact data and metadata using one or more relational star schemas, wherein the fact data and metadata are stored within the one or more tabular databases, and wherein the tabular cube comprises an organizational data structure comprising the one or more requested data dimensions and/or one or more hierarchies within the one or more requested data dimensions;

generating, by the report generator, the requested analytical report based on one or more DAX query results, wherein the one or more DAX query results are returned by the one or more tabular databases in response to the one or more constructed DAX queries;

transmitting, from the reporting service to the client service application, the requested analytical report; and rendering the requested analytical report within the client service application, wherein the user access point comprises a computer processor and an electronic storage medium.

2. The computer implemented method of claim 1, wherein the dynamic user interface is built into a tabular data engine.

3. The computer implemented method of claim 1, wherein the analytical report comprises a web-based, mobile-based, or Microsoft Excel-based report.

4. The computer implemented method of claim 1, wherein the analytical report comprises one or more visualization tools, charts, or dashboards.

5. The computer implemented method of claim 1, wherein the one or more relational star schemas comprise a Structured Query Language (SQL) Server star schema.

6. The computer implemented method of claim 1, wherein the one or more relational star schemas comprise relational data associated with tabular data stored in the one or more tabular databases.

7. The computer implemented method of claim 6, wherein the relational data comprises metadata.

8. The computer implemented method of claim 6, wherein the relational data is generated through an administrator interface and/or an integrated data source.

9. The computer implemented method of claim 8, wherein the integrated data source is integrated using Structured Query Language (SQL) Server Integration Services (SSIS).

10. The computer implemented method of claim 6, wherein the DAX query builder is in communication with the one or more relational star schemas, and wherein the one or more relational star schemas provides the relational data to the DAX Query builder.

11. The computer implemented method of claim 6, wherein the constructing the one or more DAX queries comprises utilizing the relational data.

12. The computer implemented method of claim 1, further comprising performing, by a business logic engine, one or more procedural calculations, wherein the one or more procedural calculations can be called on-demand via the dynamic user interface of a client service application.

13. The computer implemented method of claim 12, wherein the procedural calculations comprise at least one of: write-backs, foreign currency conversions, allocations, intercompany matchings and/or eliminations, binary tuple calculations, copying data from one tuple to another, MDX and/or DAX to fact data, or custom user-defined calculations.

14. The computer implemented method of claim 1, further comprising obtaining approval, via the dynamic user interface, from one or more authorized users to generate the requested analytical report.

15. The computer implemented method of claim 1, wherein the tabular cube comprises fact data and relational data.

16. A system for generating an analytical report using one or more tabular databases queryable by one or more Data Analysis Expressions (DAX), wherein the one or more tabular databases are generated from one or more unstructured data stores, the system comprising:
- a client service application comprising a spreadsheet application or a web-based application and a dynamic user interface, the dynamic user interface comprising a report designer configured to allow user input of one or more structural component inputs of an analytical data report, wherein the one or more structural component inputs comprise one or more requested data dimensions and/or one or more hierarchies within the one or more requested data dimensions, wherein the dynamic user interface is launched via the spreadsheet application or web-based application;
- a Data Analysis Expression (DAX) query builder;
- a report generator;
- a reporting service that acts as a link between the client service application and the report generator;
- one or more relational star schemas;
- the one or more tabular databases, wherein the one or more tabular databases comprise a Server Analysis Services (SSAS) tabular model and provides at least one functionality of a relational data structure and at least one functionality of a tabular data structure, wherein the Server Analysis Services (SSAS) tabular model is structured to be queried by one or more DAX queries, and wherein the one or more tabular databases comprise a tabular cube operating within a Microsoft Structured Query Language (SQL) Server, wherein the tabular cube is constructed by retroactively transforming and separating one or more unstructured data stores accessible by the Microsoft Structured Query Language (SQL) Server into fact data and metadata using the one or more relational star schemas, wherein the fact data and metadata are stored within the one or more tabular databases, and wherein the tabular cube comprises an organizational data structure comprising the one or more requested data dimensions and/or one or more hierarchies within the one or more requested data dimensions;
- one or more computer readable storage devices; and
- one or more hardware computer processors configured to:
  - receive, via the report designer, the one or more structural component inputs of the requested analytical data report;
  - transmit the one or more structural component inputs to the reporting service;
  - construct, by the report generator, in conjunction with the DAX query builder, one or more DAX queries based on the received one or more structural component inputs of the requested analytical report;
  - query the one or more tabular databases using the one or more constructed DAX queries;
  - generate, by the report generator, the requested analytical data report based on one or more DAX query results, wherein the one or more DAX query results are returned by the one or more tabular databases in response to the one or more constructed DAX queries;
  - transmit, from the reporting service to the client service application, the requested analytical report; and
  - render the requested analytical report within the client service application.

17. The system of claim 16, wherein the one or more hardware computer processors are further configured to perform a write-back on the one or more tabular databases through the tabular data engine.

18. The system of claim 16, wherein the dynamic user interface is built into a tabular data engine.

19. The system of claim 16, wherein the analytical report comprises a web-based, mobile-based, or Microsoft Excel-based report.

20. The system of claim 16, wherein the analytical report comprises one or more visualization tools, charts, or dashboards.

* * * * *